Feb. 1, 1966    J. H. AUER, JR., ETAL    3,233,212
VEHICLE DETECTION AND SPEED MEASURING APPARATUS
Filed April 12, 1961    9 Sheets-Sheet 1
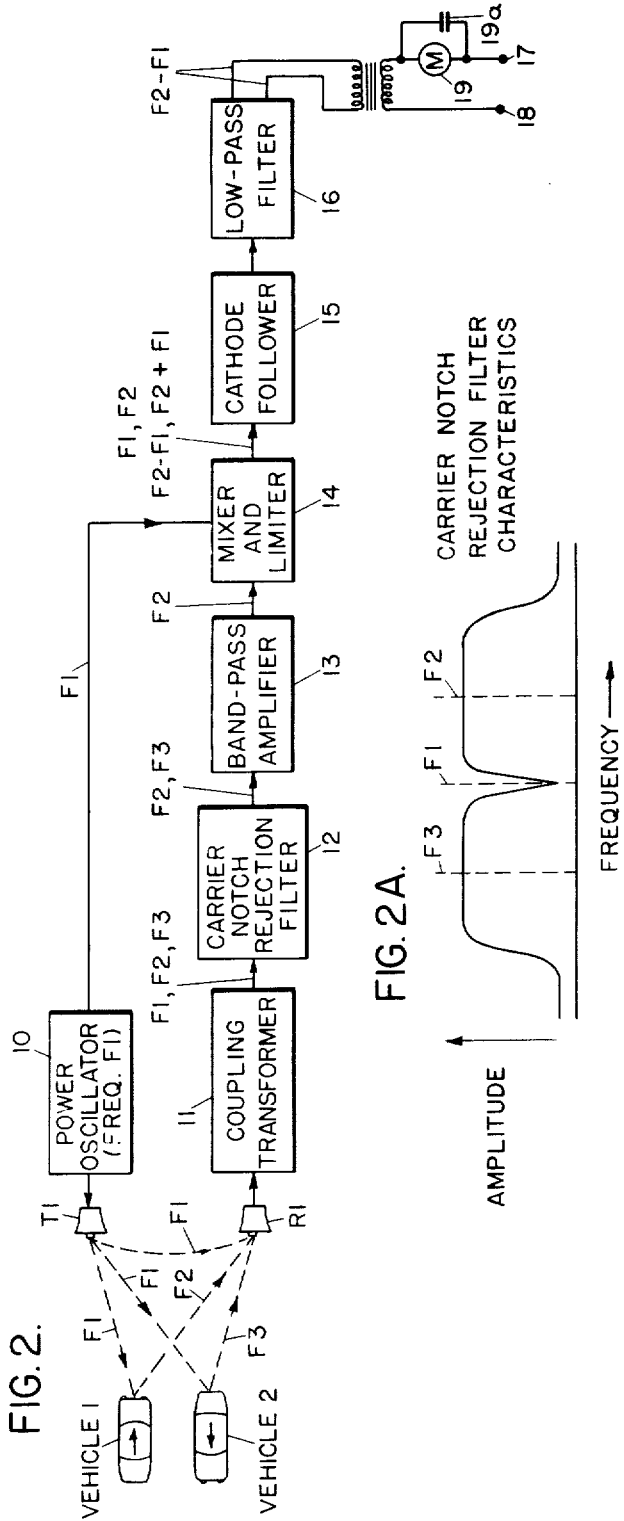
*INVENTORS*
J.H. AUER JR. AND
K.H. FRIELINGHAUS
BY
*Forest B. Hitchcock*
THEIR ATTORNEY

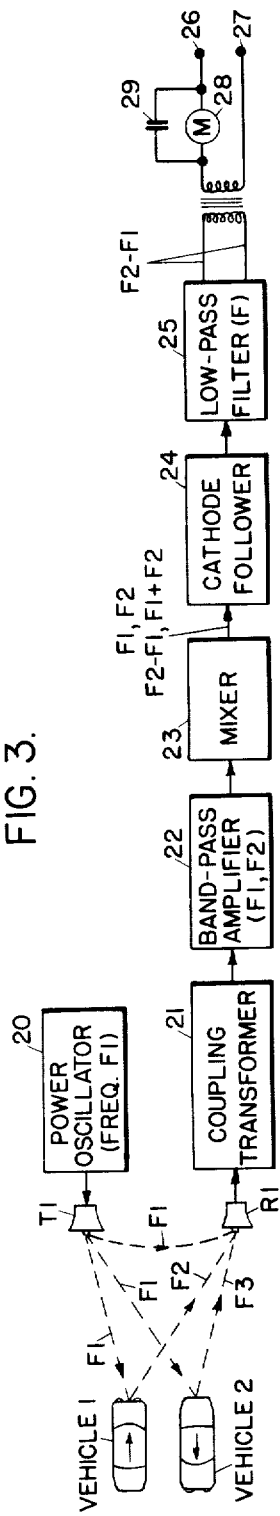
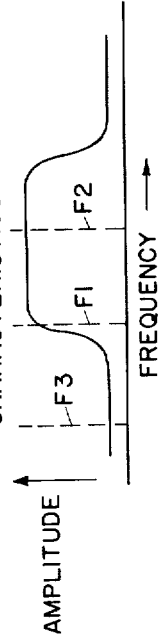
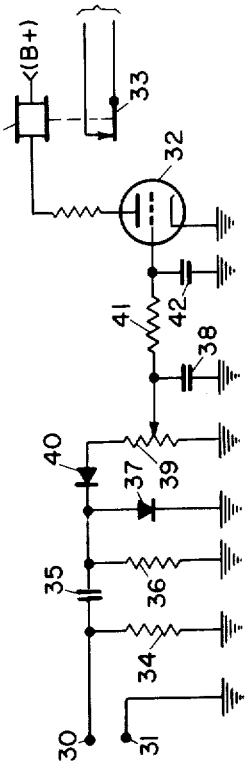

Feb. 1, 1966 J. H. AUER, JR., ETAL 3,233,212
VEHICLE DETECTION AND SPEED MEASURING APPARATUS
Filed April 12, 1961 9 Sheets-Sheet 3
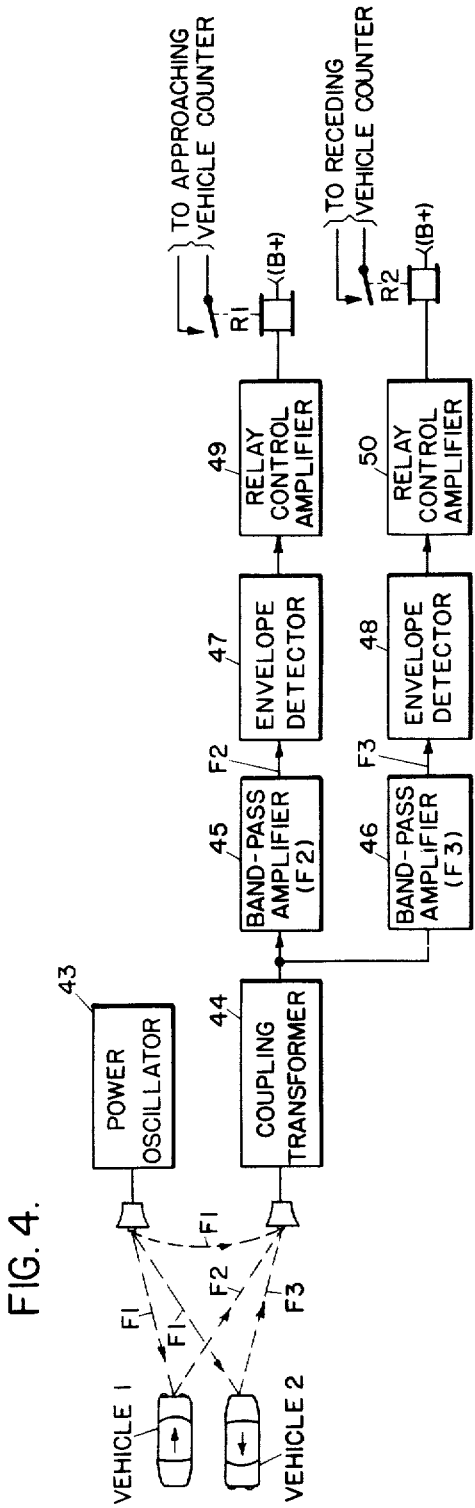
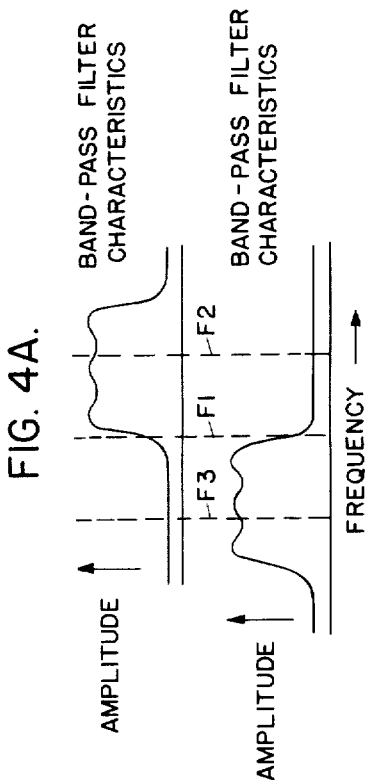
*INVENTORS.*
J. H. AUER JR. AND
K. H. FRIELINGHAUS
BY
THEIR ATTORNEY

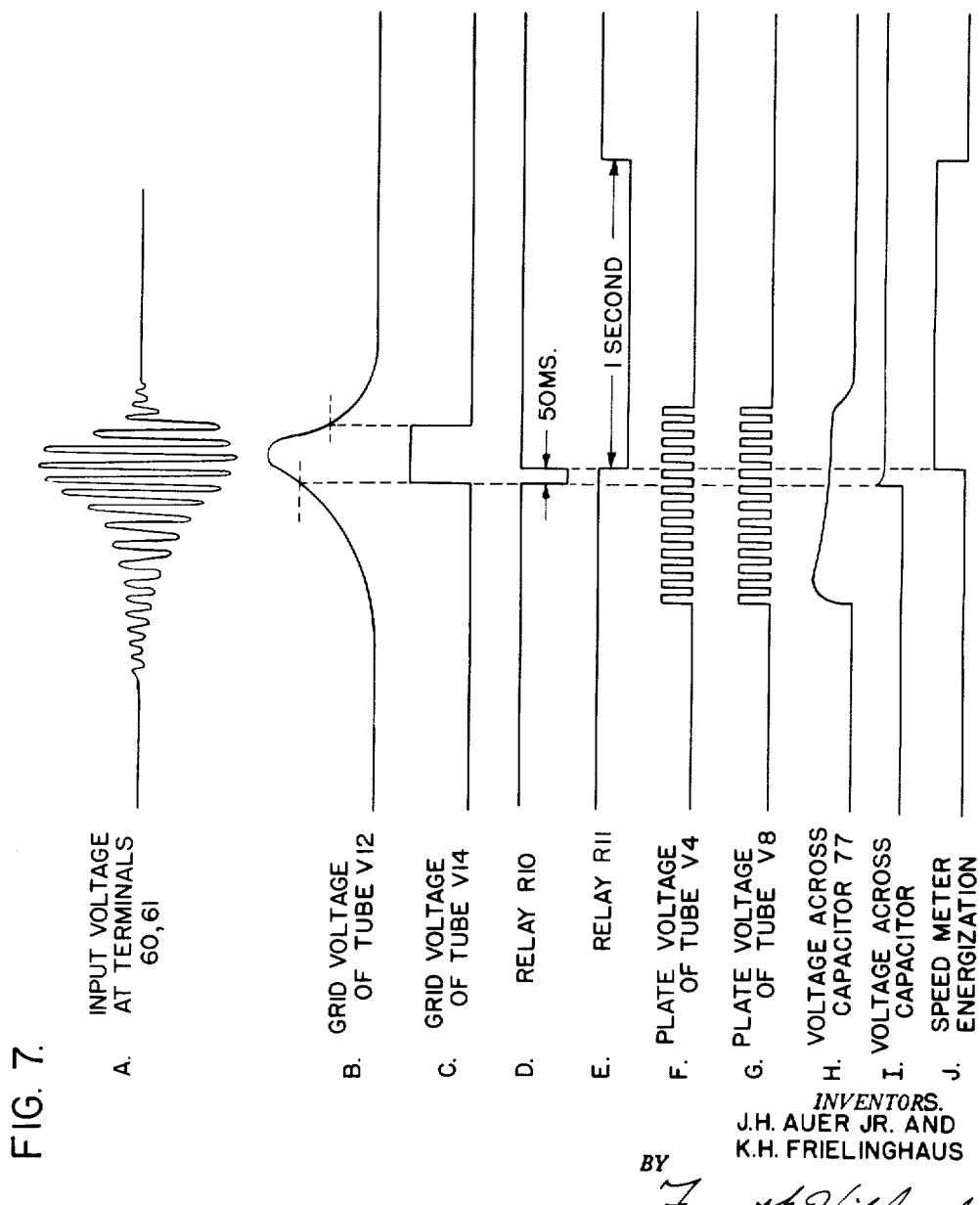

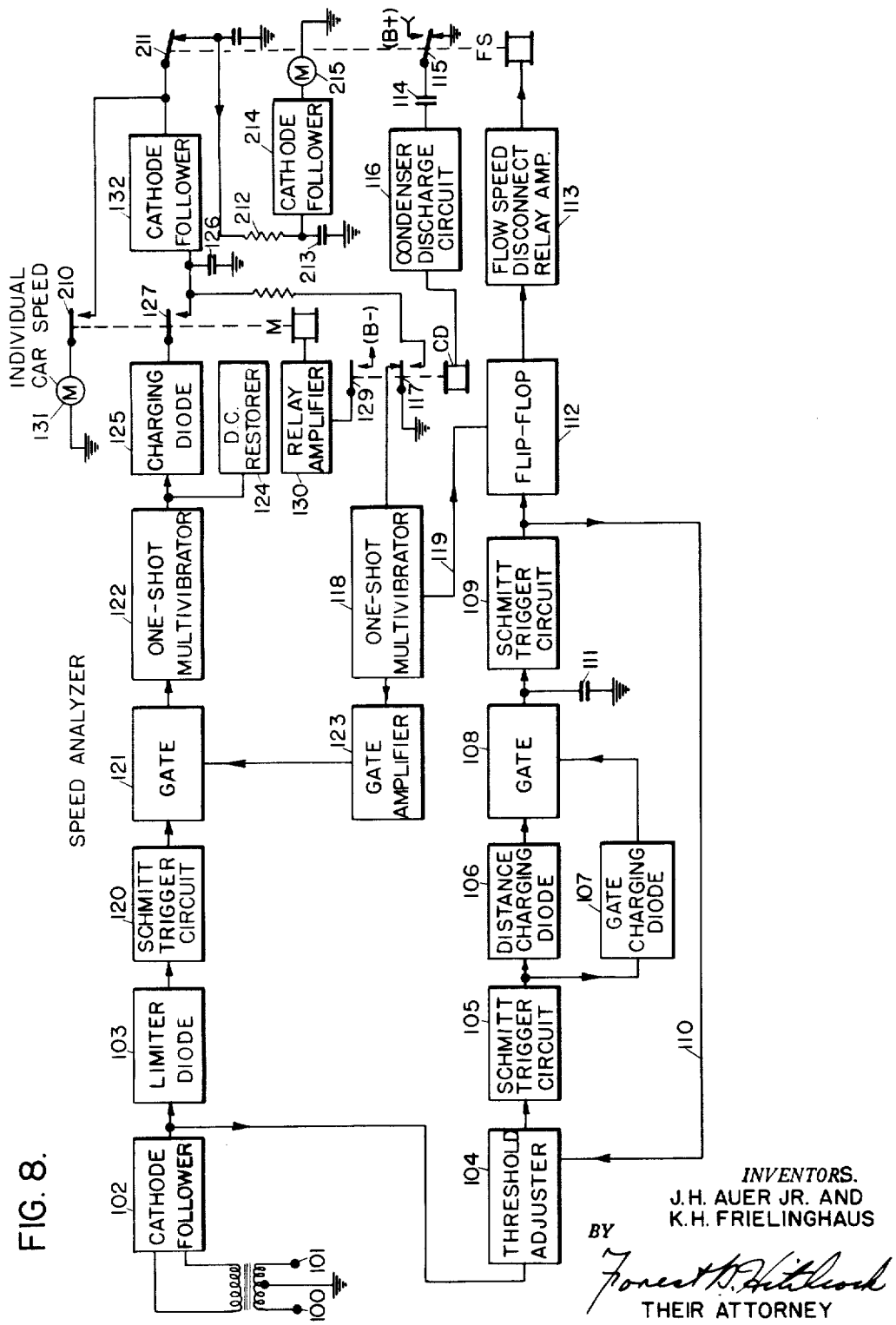

INVENTORS.
J.H. AUER JR. AND
K.H. FRIELINGHAUS
BY
*Forest B. Hitchcock*
THEIR ATTORNEY

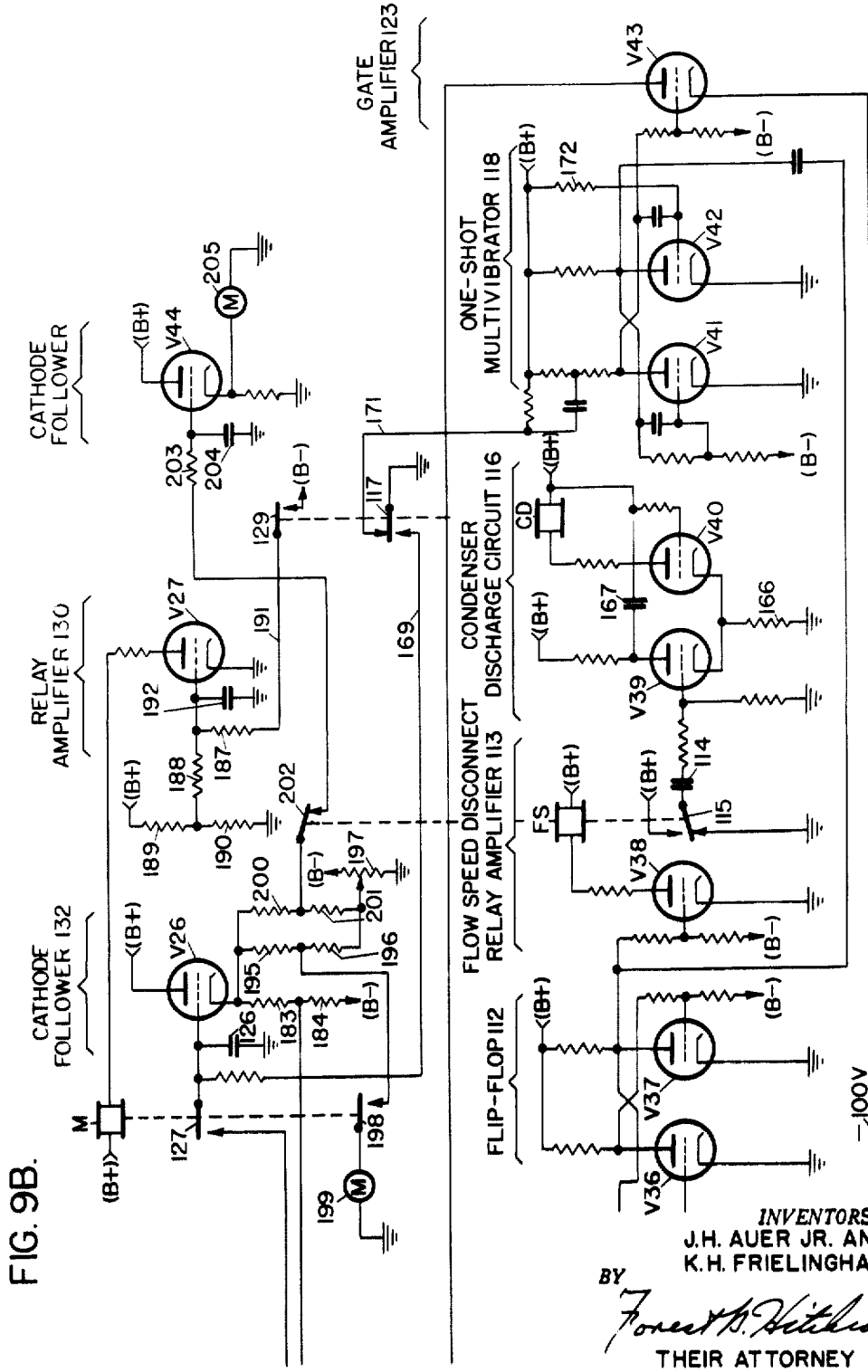

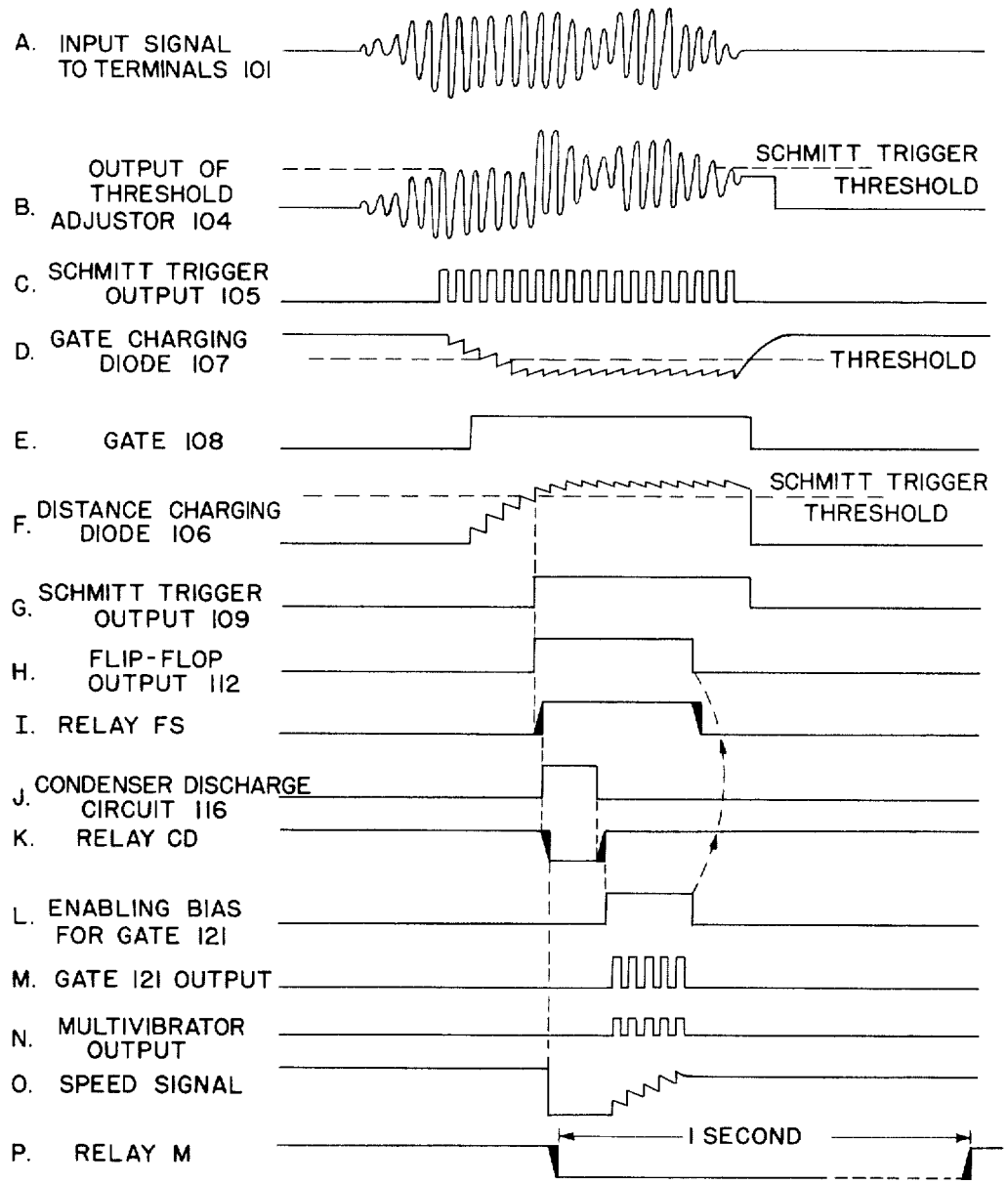

3,233,212
VEHICLE DETECTION AND SPEED MEASURING APPARATUS
John H. Auer, Jr., and Klaus H. Frielinghaus, Rochester, N.Y., assignors to General Signal Corporation
Filed Apr. 12, 1961, Ser. No. 102,558
11 Claims. (Cl. 340—1)

This invention relates to apparatus for detecting the presence of individual vehicles as they pass through a detection zone and/or measuring the speed of such vehicles and more particularly pertains to apparatus for accomplishing these purposes which utilizes the Doppler frequency shift of a sound wave produced by moving vehicles.

In the control of vehicular traffic, it is often important that it be possible to detect and count the number of vehicles passing over a particular stretch of highway. Sometimes, it is also necessary that information be obtained as to the speed of individual vehicles as they pass a given point and also the speed of traffic in general, i.e., "flow velocity," as opposed to the speeds of individual vehicles.

Various techniques have been employed by the prior art for detecting the presence of vehicles. In measuring the speed of vehicles, a common technique has been to direct a beam of radio frequency energy toward moving vehicles and receive therefrom a reflected beam which has a Doppler frequency shift, the amount of which is dependent upon the magnitude of the component of velocity of the vehicle in the direction of the beam. Such systems have proved to be practical and are in quite widespread use. Nevertheless, one disadvantage of these systems is that they are not able to discriminate according to vehicle direction, i.e., an output representing vehicle speed will be obtained as well from a vehicle moving in the direction of the transmitted beam as from a vehicle moving in the opposite direction. This often presents considerable difficulty since it is usually desired that vehicle speed be monitored only as to those cars proceeding in a particular direction along the highway. Another difficulty is that if two vehicles should occupy the transmitted beam simultaneously, there will be both a tendency for the frequency to be shifted upwardly and at the same time downwardly and these opposite effects tend to cancel so that highly erratic results are produced and the speed information thus obtained is useless.

Described briefly, it is contemplated by the present invention to employ sound energy, preferably but not necessarily having an ultrasonic frequency such as 20 kc. per second. The sound energy is transmitted by a transmitting transducer in the form of a confined, steady-energy beam having a substantial component in the direction of travel of the vehicles or opposite thereto, dependent upon the direction of the vehicles along the highway. For a vehicle which is traveling in the direction of the transmitted sound energy, there is a reflection of such energy back toward a receiver transducer (preferably located near the transmitting transducer), and this reflected energy has a frequency that is, of course, lower than that of the transmitted sound energy. In an entirely similar manner, a vehicle moving in the opposite direction, i.e., toward the transmitter-receiver location, will reflect sound energy having a frequency higher than that of the transmitted sound beam. In each case, the amount of the Doppler frequency shift is proportional to the component of vehicle velocity which is in the direction of the sound beam.

The reflected energy is amplified and then applied to one or more filtering circuits. As a result of the filtering that takes place, the upper Doppler shift frequency resulting from an approaching vehicle is segregated from the lower Doppler shift frequency resulting from a receding vehicle. A portion of the transmitted signal may be mixed with the rejected Doppler shift signal either before or after the filtering so that a beat frequency signal is obtained. Various alternative techniques are disclosed herein which provide for determining the amount of the beat frequency so that a measure of vehicle speed can thereby be obtained.

Obviously, the reflected signals can be utilized also to indicate the presence of a vehicle and such vehicle detector will then be directionally sensitive. In other words, the existence of reflected energy at the higher Doppler shift frequency provides an indication that there is a vehicle within the detection zone and that it is moving in a direction toward the transmitter-receiver location. Similarly, the reception of a reflected signal at the lower Doppler shift frequency indicates that there is a vehicle going in the opposite direction and passing through the detection zone.

The filtering techniques disclosed herein to separate the upper frequency shift from the lower frequency shift and thereby obtain speed and presence information for vehicles in respectively different directions, are possible because of the use of sound energy rather than radio frequency energy such as has normally been employed in Doppler detection and speed measuring apparatus. When radio frequency energy is employed, the actual frequency shift, although it may be significant, is nevertheless a minute fraction of the frequency of the transmitted signal. For this reason, it is impossible by the use of filtering techniques to separate the Doppler frequency shift signal from the transmitted signal or from another Doppler signal for a vehicle moving in the opposite direction. However, when sound energy is employed, as in the present invention, the amount of frequency shift is not only significant even for vehicles traveling at relatively low speeds but is an appreciable portion of the frequency of the transmitted signal, and this permits it to be quite readily separated from the transmitted signal by commercially available filtering circuits. For example, when the transmitted frequency is of 20 kc. per second, the Doppler frequency shift is approximately 54 cycles per second for each mile per hour of velocity of the object in the direction of the signal. Because of this, two vehicles traveling in the opposite directions with velocity components in the direction of the detector of two miles per hour for each vehicle will produce respective Doppler frequency shift signals which are separated by approximately 200 cycles per second. These two signals can readily be separated so that speed and also vehicle presence information for the two vehicles can be separately determined.

It is thus an object of the present invention to provide vehicle speed measuring and/or detection apparatus wherein a beam of sound energy is transmitted toward the moving vehicle and wherein the resulting Doppler frequency shift is measured to give an output representing the vehicle speed.

It is another object of this invention to provide vehicle speed measuring apparatus wherein sound energy is transmitted generally along the direction of vehicle movement and wherein the Doppler frequency shift signal for vehicles moving in a particular direction is received while the Doppler frequency shift signal for vehicles moving in the opposite direction is discriminated against so that vehicle speed is measured only for vehicles moving in said particular direction.

It is another object of this invention to provide a Doppler vehicle speed detection system wherein the Doppler frequency shift signals for vehicles traveling in opposite directions are segregated so that vehicle speed for the vehicles moving in opposite directions can be separately determined.

It is another object of this invention to provide a Doppler speed measuring system for vehicles in which a beat frequency signal is obtained and in which an analog is derived which is proportional to the repetittion rate of the successive beat frequency signal, said analog being then also proportional to vehicle speed.

It is a further object of this invention to provide a Doppler speed measuring system wherein an analog is derived which is proportional to the number of beat frequency cycles occurring within a predetermined time interval, said analog being then also proportional to speed.

Other objects, purposes, and characteristic features of the present invention will in part be disclosed in the drawings and in part be pointed out as the description of the invention progresses.

In describing the invention in detail, reference will be made to the accompanying drawings wherein:

FIGS. 1 and 1A illustrate the manner in which the transmitting and receiving transducers may be positioned over the different lanes of a roadway;

FIG. 2 illustrates in block diagram form one way in which, according to this invention, a beat frequency signal representing vehicle speed is provided only with respect to vehicles traveling in a particular direction on the roadway and not with respect to vehicles traveling in the opposite direction;

Figure 6:
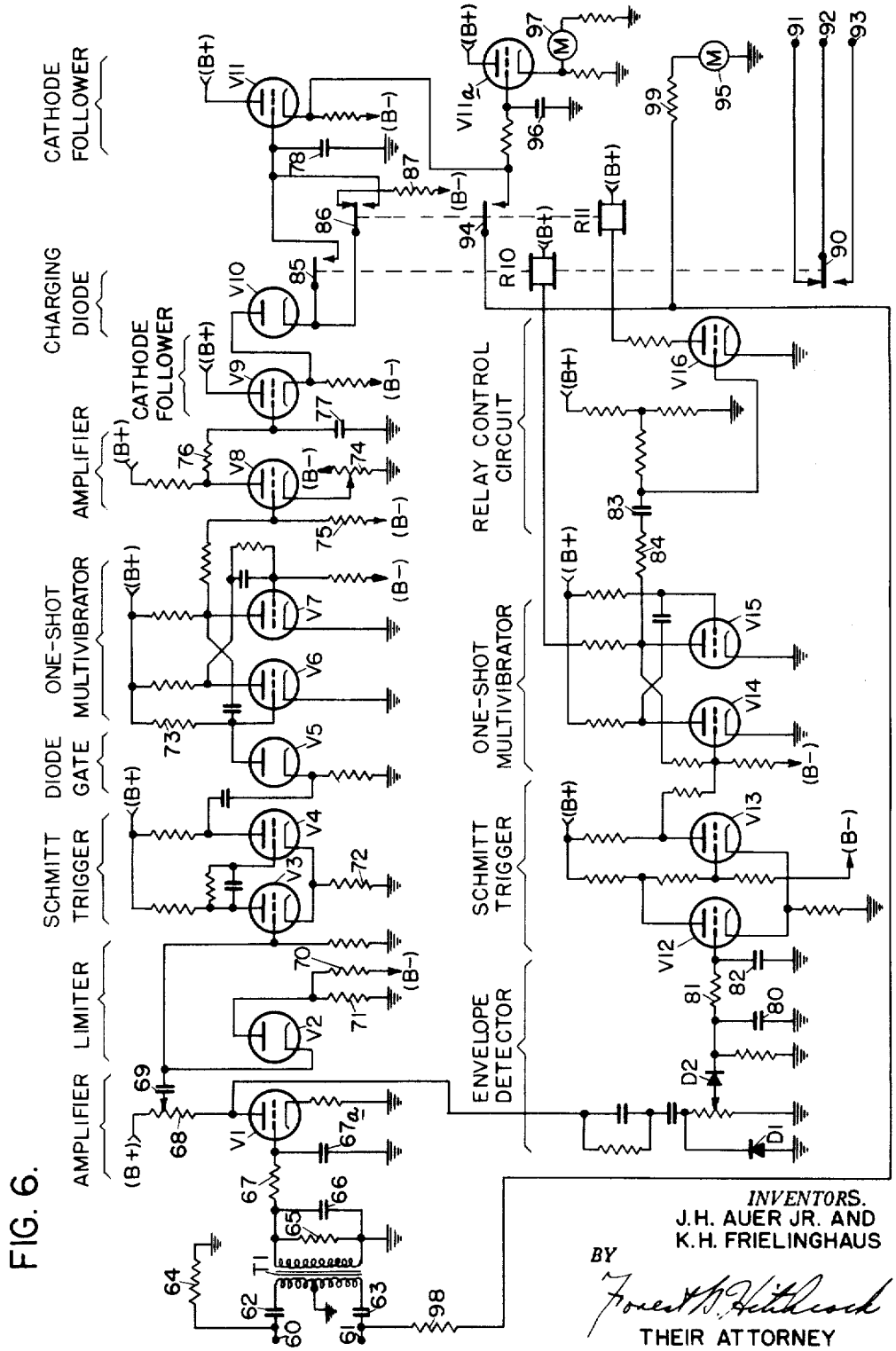
Figure 9A:
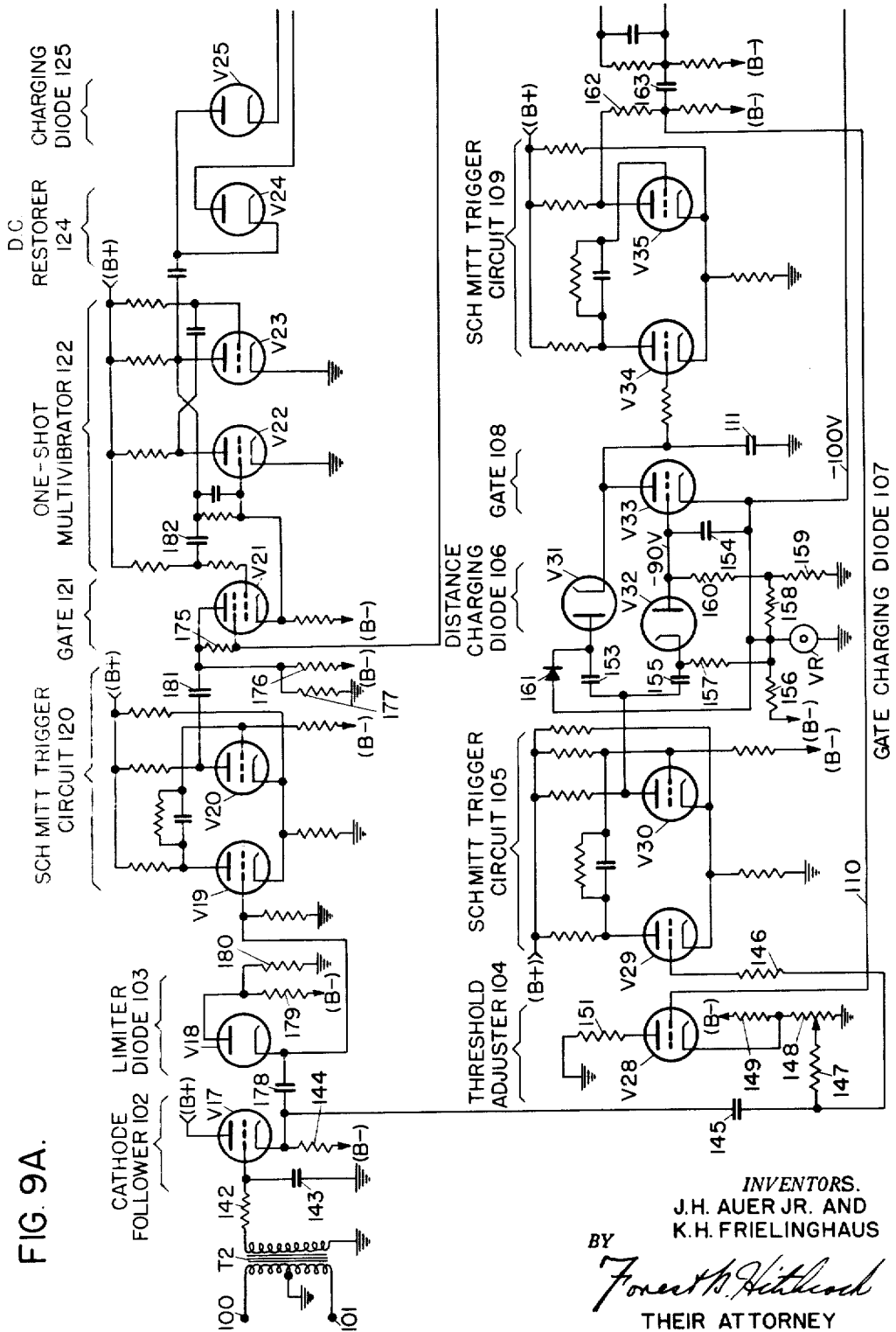

FIG. 2A graphically illustrates the characteristics of the filtering circuit of FIG. 2;

FIG. 3 illustrates an alternative embodiment of the invention for obtaining speed data with respect to a vehicle moving in a particular direction along the roadway;

FIG. 3A graphically illustrates the band-pass characteristics of the amplifier of FIG. 3;

FIG. 4 is a block form diagram of still another embodiment of the invention whereby vehicles traveling in either of opposite directions along the roadway are separately detected;

FIG. 4A illustrates graphically the characteristics of the two different filter circuits of FIG. 4;

FIG. 5 is a circuit diagram of a typical relay control circuit which may be employed in connection with the embodiments of the invention illustrated in FIGS. 2, 3, and 4 for the purpose of detecting the passage of a vehicle through the detection zone;

FIG. 6 is a circuit diagram of an electronic circuit which may be connected to the outputs of the circuits shown in FIGS. 2 and 3 and which illustrates the manner in which the speed signal there obtained may be utilized;

FIG. 7 is a waveform diagram illustrating various voltage waveforms appearing in the circuit of FIG. 6;

FIG. 8 is a block diagram of an alternative electronic circuit as compared with that of FIG. 6;

FIGS. 9A and 9B are detailed circuits of the circuit organization of FIG. 8; and FIG. 10 is a waveform diagram illustrating various voltage waveforms appearing in the circuit of FIGS. 9A and 9B.

*Positioning of sound transducers—FIGS. 1, 1A*

FIGS. 1 and 1A illustrate the manner in which the sound transducers may be disposed relative to the lanes of a highway in order to practice the present invention. With respect to any lane where individual vehicles are to be either detected and/or have their speed measured, both a transmitting transducer T and a receiving transducer R may be positioned on an overhead bridge. Both these transducers may alternatively, if desired, be positioned alongside the edge of the roadway. In any event, the transducers are both so directed that their maximum sensitivity lies along an axis having a substantial component in the direction of travel of the vehicle. Ordinarily, each transducer is so constructed and so mounted and directed that the detection zone defined thereby along the roadway is confined to a particular lane of traffic, but this is not essential to the present invention, especially when the nearby lane is intended to accommodate traffic moving in a direction opposite from that in the lane which that transducer is intended to serve. The reason for this is, of course, that the vehicle detection and speed measuring apparatus for one lane wherein vehicles travel in a particular direction can be made to be wholly unaffected by the passage of vehicles in the nearby lane traveling in the opposite direction. In fact, the equipment will even be insensitive to vehicles moving in said opposite direction when they move in the very lane which these two transducers are intended to serve.

As will hereinafter be described, the transmitting transducer is in each case energized with an electrical signal having an ultrasonic frequency such as 20 kc. per second. Preferably, the energization is steady rather than pulsed, but it will be obvious to one skilled in the art that the principles of this invention are applicable also to systems in which pulsed sound energy is employed. It will be noted from FIG. 1A particularly that the sound beam is not exactly parallel to the direction of traffic of the vehicles, and this situation will exist regardless of whether the transducers are mounted on a bridge over the top of the highway lane or are positioned along the edge of the roadway. Because of this, the apparent velocity of each vehicle will vary as it passes through the sound beam since the component of the incident sound energy which is parallel to the direction of traffic of the vehicle varies with the position of the vehicle. Therefore, the Doppler frequency shift which results will vary with the position of the vehicle even though the vehicle maintains a constant speed while it is within the detection zone. Nevertheless, as will subsequently be described in detail, the apparatus of this invention makes it possible to obtain valid speed data with only negligible error resulting from this so-called "cosine factor."

*Embodiment of FIG. 2*

Considering first the embodiment of the invention illustrated in FIG. 2, a power oscillator 10 is shown as energizing the transmitting transducer T1. The oscillator 10 may be of any conventional type, preferably being one wherein the frequency of its output signal is maintained quite closely to the design value, which, as previously stated, may be in the order of 20 kc. per second.

As shown in FIG. 2, the steady sound energy emanating from the transmitting transducer impinges upon any vehicle within the detection zone along the highway which is defined by the transmitted sound beam. For any vehicle which is approaching the transmitter location, and thereby providing a continuously shorter propagation time of the sound beam from the transmitting transducer T1 to the receiving tranducer R1, the frequency of such reflected signal is increased by an amount proportional to the velocity of the approaching vehicle. In FIG. 2, this higher frequency which results from the well-known Doppler shift, is designated as frequency F2. In a similar manner, for a vehicle moving in the opposite direction, i.e., receding from the location of the transmitting and receiving transducers, the frequency of the signal reflected back from such vehicle to the receiving transducer R1 is at a lower frequency which is designated in FIG. 2 as being frequency F3.

Since a portion of the energy emanating from the transmitting transducer T1 is also received directly rather than via reflection by the receiving transducer R1, the signal that is then applied through the coupling transformer 11 and thence to the carrier notch rejection filter 12 comprises frequencies F1, F2, and F3. The amplitude-frequency characteristics of such a filter are illustrated in FIG. 2A. Thus, the filter 12 is so organized that it will readily pass the upper Doppler shift frequency F2 and also the lower Doppler shift frequency F3, but it strongly discriminates against the transmitted frequency F1. The output of this filter, therefore, comprises only the frequencies F2 and F3, assuming of course that there are two vehicles within the detection zone and going in respective opposite directions so as to produce such two different Doppler shift frequencies.

The band-pass amplifier 13 may comprise a plurality of stagger-tuned amplifier stages with the tuning for the various stages so adjusted that frequencies above the carrier frequency F1 and falling within a predetermined range will be amplified but all other frequencies will be rejected and so not pass on to the mixer and limiter 14. Since, as previously stated, the Doppler shift frequency for a transmitted signal of 20 kc. per second will be approximately 54 cycles for each mile per hour of velocity, it follows that the band-pass amplifier 13 may be constructed to pass a band of frequencies which will include frequencies from the carrier frequency F1 and extending to a frequency which is approximately 3,000 cycles above the frequency F1 in order to accommodate vehicle speeds approaching 70 miles per hour. More specifically, if the frequency F1 is exactly at 20 kc. per second, the band-pass amplifier 13 may be so organized as to pass frequencies from 20 kc. up to 23 kc. and in this way will pass the Doppler shift frequency for an approaching vehicle even if that vehicle is going nearly 70 miles per hour.

A carrier notch rejection filter is used in conjunction with the band-pass amplifier 13 in order that the upper Doppler shift frequency may be passed even though it is at a low value and quite close to the frequency F1, as it is for an approaching vehicle going at quite slow speed. Thus, the filter 12 has sharp cut-off characteristics with respect to the carrier frequency F1 so that this frequency cannot be passed by the band-pass amplifier even though a frequency F2 which is only slightly above frequency F1 will be passed. Incidentally, if there is a receding vehicle at the same time within the sound beam, the resulting lower side band frequency F3 will be passed by the rejection filter 12 but will readily be eliminated by the band-pass amplifier 13.

The reason for eliminating the carrier frequency F1 is to permit a controlled amount of signal at this frequency F1 to later be supplied to the mixer and limiter 14. It has been determined experimentally that an optimum ratio of this signal to that of the signal with which it is to be mixed, i.e., frequency F2, will produce a maximum amplitude of difference frequency $F2-F1$. In other words, the mixer and limiter 14 receives the upper Doppler shift frequency F2 from amplifier 13. By mixing with this frequency F2 a controlled amount of the frequency F1, it is possible to select the ratio in amplitude between these two mixed signals so that the difference frequency which is desired, namely, the frequency $F2-F1$, will be at a maximum value.

The output of mixer 14 comprises not only this desired difference frequency, $F2-F1$, but also the sum of these two frequencies $F2+F1$, and also the individual frequencies F1 and F2 themselves. The resulting signal is amplified by a cathode follower 15, whose output is then applied to a low-pass filter 16. This low-pass filter has its cut-off frequency somewhat above the desired difference frequency $F2-F1$ so that it will readily pass this difference frequency. However, the filter 16 will discriminate against the other considerably higher frequencies F1, F2, and the sum frequency $F2+F1$. The output of filter 16 is transformer-coupled to the output terminals 17 and 18, and as a result, there appears at these output terminals a signal whose frequency, $F2-F1$, is directly proportional to vehicle speed. The function of meter 19 and capacitor 19a will later be described. It is obvious from the foregoing description, that this difference frequency will only appear at the terminals 17 and 18 for a vehicle that is approaching toward the location of the transmitting and receiving transducers.

Obviously, the various filters could be so constructed that the output frequency at terminals 17 and 18 would appear there only for a vehicle which is going in the opposite direction, i.e., receding from the location of the transmitting and receiving transducers. In order to accomplish this, it would only be necessary to construct the band-pass amplifier 13 so that it would readily pass the frequency F3 but not the frequency F2. The difference frequency then obtained from the limiter 14 would be the frequency $F1-F3$, and this difference frequency would be in the same range as the difference frequency $F2-F1$ so that there would not be any change made in the characteristics of the low-pass filter 16.

*Embodiment of FIG. 3*

Although the characteristics of the carrier notch rejection filter 12 of FIG. 2 are such that it sharply discriminates against the carrier frequency while still providing a relatively sharp cut-off so that frequencies somewhat above the carrier frequency and below it as well are passed by the filter, nevertheless, those frequencies which are very close to the carrier frequency may still be discriminated against. Thus, a slowly approaching vehicle will produce an upper side band frequency F2 which will be quite close to F1 and will tend also to be rejected, at least in part, by the filter 12. Because of this, it is not possible to obtain speed information accurately for vehicles moving at quite slow speeds. To overcome this last-mentioned difficulty, in a situation where it is desired to measure vehicle velocities at quite low values, it is preferable to use instead the embodiment of FIG. 3 of this invention.

As with the embodiment of FIG. 2, FIG. 3 discloses a power oscillator 20 which transmits a frequency F1 towards vehicles moving along the highway. For a receding vehicle, the reflected signal received by the receiving transducer R1 is of a lower frequency than the transmitted frequency and is designated as F3. An approaching vehicle, on the other hand, provides a reflected sound signal at a higher Doppler shift frequency, F2. Therefore, if both approaching and receding vehicles simultaneously reflect sound energy toward receiving transducer R1, this transducer will receive the frequencies F2, F3, and also F1 which it receives directly from the transmitting transducer T1. The sound wave signals are converted by the transducer R1 into electrical signals which are then applied through the coupling transformer 21 to a band-pass amplifier 22. This amplifier is so constructed as to have the lower limit of its band-pass at the carrier frequency F1 as shown in FIG. 3A. The width of its band-pass characteristics is such that it will admit a frequency F2 even when this frequency is above the frequency F1 by as much as approximately 3,000 cycles, which is the amount of the difference frequency for a 20 kc. per second transmitted signal and a vehicle velocity of nearly 70 miles per hour. It will be noted that frequency F3, which is the lower Doppler shift frequency resulting from the receding vehicle, is discriminated against by the band-pass amplifier 22 so that no output signal at this frequency F3 is applied to the mixer 23.

Since the amplifier 22 passes both frequencies F1 and F2, it is not necessary to later inject directly from the oscillator 20 a selected amount of the carrier frequency F1. Thus, by comparing this embodiment of the invention with that illustrated in FIG. 2, it will be apparent that it is here not possible to inject a predetermined portion of the carrier frequency F1 and it is thus not possible to obtain exactly the desired ratio so as to obtain the maximum amplitude of difference frequency signal. On the other hand, the embodiment of the invention does have the advantage that the frequency F2 will be passed to the mixer even when it is quite close to the carrier frequency F1 as it will be for vehicles traveling at quite slow speeds. In other words, the embodiment of the invention shown in FIG. 3 is better able to provide speed information for slow moving vehicles.

As a result of the heterodyning action of the mixer 23, the output thereof comprises the frequencies F1, F2, the sum frequency $F2+F1$, and the difference frequency, $F2-F1$. These signals are all amplified by a cathode follower 24 and then applied to the low-pass filter 25 which is so constructed that it will pass only the lower of these frequencies, i.e., the difference frequency $F2-F1$. The filter output is transformer-coupled to the output terminals 26 and 27. The parallel combination of meter 28 and capacitor 29 is included in series with the transformer secondary winding for reasons to be set forth below.

Vehicle detector circuit—FIG. 5

When it is desired that the apparatus be capable of detecting the passage of a vehicle in a particular direction through the detection zone without providing speed data, the circuit of FIG. 5 may be provided. It will be understood that the circuit of FIG. 5 is intended to operate in response to a beat frequency signal derived in the manner shown in FIGS. 2 or 3 and that input terminals 30 and 31 are connected respectively to terminals 17 and 18 of the circuit of FIG. 2, or alternatively, to the terminals 26 and 27 of the form of the invention shown in FIG. 3.

In general, the circuit organization of FIG. 5 comprises an envelope detector which is responsive to the output amplitude of the beat frequency signal derived from the circuits of FIG. 2 or FIG. 3 so that when the envelope of the signal reaches a particular amplitude, the normally conductive amplifier tube 32 will be cut off and drop away relay R whose winding is in series with the plate-cathode circuit. The output contacts of this relay, such as contact 33 shown in FIG. 5, may be used to provide an input to a counter, for example, so that the counter input is opened momentarily by such contact 33 for each passing vehicle.

The input to the terminals 30 and 31 comprises an alternating-current signal whose amplitude is at a minimum value when the vehicle first enters the detection zone defined by the transmitted sound beam and whose frequency is proportional to the speed of the vehicle. As the vehicle progresses further through the beam, the reflected signal and thus the beat frequency signal applied to terminals 30 and 31 increases to some maximum value and then again recedes to near zero as the vehicle moves out of the sound beam. The resulting wave form may, therefore, have the general wave shape as shown in FIG. 7 at line A.

The input signal is coupled through a shunt resistor 34 and series capacitor 35 so that the beat frequency signal also appears across resistor 36. The presence of the shunt diode 37 prevents the voltage at its upper terminal from ever becoming positive with respect to ground since, if it were to do so, there would be conduction through the diode. However, the voltage at the upper terminal of diode 37 can go negative, below ground, by the full amount of the peak-to-peak swing of the beat frequency signal. Each negative voltage swing causes capacitor 38 to be negatively charged through the upper portion of potentiometer 39 and through diode 40 in the forward or low resistance direction. When the beat frequency signal becomes of sufficient amplitude, the negative voltage at the upper terminal of capacitor 38 becomes sufficiently negative so that it will drive the control grid of tube 32 to cut-off. The function of resistor 41 and capacitor 42 is to filter out most of the ripple of the beat frequency signal so that a direct-current voltage appears at the grid of tube 32. As a result, only a beat frequency signal of sufficient amplitude to indicate that it is a bona fide signal obtained from a vehicle within the detection zone defined by the sound beam will result in the cutting off of tube 32 and the dropping away of detection relay R.

Vehicle detector, bidirectional—FIG. 4

From the description already given, it is apparent that the upper and lower Doppler shift frequency signals can readily be segregated, and it is thus apparent that they may both be utilized, each one for detecting the presence or passage of a vehicle through the detection zone in a respective direction. FIG. 4 illustrates in block diagram form one manner in which this may be accomplished.

In FIG. 4, the usual power oscillator is employed to transmit a frequency from a transmitting transducer at frequency F1 toward both approaching and receding vehicles. The reflected signals are shifted in frequency by the Doppler effect so that the receiving transducer provides electrical output signals at frequencies F1, F2 and F3. These are applied through a coupling transformer 44 to a band-pass amplifier 45 and another parallel band-pass amplifier 46. The amplifier 45 is tuned so that it will pass only frequency F2. In a similar manner, the band-pass amplifier 46 is tuned to pass only frequency F3, rejecting or discriminating against both the transmitted frequency F1 and the higher Doppler shift frequency F2.

When it is only desired that the vehicle be detected without also measuring its speed, it is then unnecessary to mix the Doppler shift frequency such as F2 with the transmitted frequency F1 to obtain a beat frequency signal. Instead, it is only necessary to detect the presence of a shift frequency such as F2 to ascertain that a vehicle is approaching. Similarly, the mere detection of the presence of a lower shift frequency F3 indicates that a vehicle is in the detection zone and receding from the location of the transmitting and receiving transducers. To accomplish these results, the amplifier 45 supplies its output to envelope detector 47, and the amplifier 46 similarly supplies its output to a corresponding envelope detector 48. Both these envelope detectors may be constructed to be similar to that shown in FIG. 5. Accordingly, each respective relay control amplifier 49 or 50 will control the associated relay R1 or R2 to drop away when the Doppler shift frequency signal obtained from the associated band-pass amplifier 45 or 46 is of sufficient amplitude. Relay R1 will therefore drop away for each inbound vehicle passing through the detection zone, and the similar relay R2 will drop away from each outbound vehicle.

The band-pass characteristics of the two amplifiers 45 and 46 are shown in FIG. 4A. The upper graphical representation illustrates the characteristics of the amplifier 45, and it is shown there that this band-pass amplifier 45 will pass only the upper Doppler shift frequency F2 which is obtained as a reflection signal from an approaching or inbound vehicle. In a similar manner, the amplifier 46 is so tuned that it will pass only the lower Doppler shift frequency F3 and will thus provide an output signal to the associated envelope detector 48 only for an outbound or receding vehicle.

FIG. 6 is a detailed circuit diagram showing the circuit organization which may be used to obtain vehicle speed data from the beat frequency signal which may be applied to it from a circuit of the type shown in FIGS. 2 or 3. FIG. 7 is a wave form diagram which illustrates the various voltage wave forms that appear at various portions of the circuit of FIG. 6.

It will be understood that the input terminals 60 and 61 of the circuit of FIG. 6 may be connected to the output terminals 17 and 18 of a circuit such as shown in FIG. 2 or alternatively to the output terminals 26 and 27 of an alternative circuit shown in FIG. 3. The wave form of this input signal may have the general wave shape shown at line A of FIG. 7. It is shown there that this signal is an alternating signal which is of low amplitude initially as the vehicle first enters the transmitted sound beam but then increases in amplitude appreciably, ordinarily reaching a peak amplitude when the signal is directed from the windshield of an approaching vehicle. As the vehicle begins to pass out of the detection zone, the amplitude of the particular frequency signal decreases rather abruptly. The frequency of this signal is, of course, directly related to the velocity of the vehicle. It should be understood, however, that it is not essential for the circuit of FIG. 6 to receive its input from a circuit such as that shown in FIGS. 2 or 3. Thus, it is only necessary that there be applied to the terminals 60 and 61 a beat frequency signal whose frequency is proportional to vehicle speed. Moreover, although the principles of this invention are especially applicable to a system wherein the beat frequency has those values which would ordinarily be produced by a system employing a sonic frequency, the speed analyzer circuit of FIG. 6 and also that of FIG. 9 to be described later are both operable in response to a beat frequency signal produced by the Doppler frequency shift of a radio frequency wave.

This input signal is applied to the primary winding of transformer T1 whose center tap is grounded so as to balance the two line wires connecting the output of the circuits of FIGS. 2 or 3 to the input terminals 60 and 61. When the apparatus of FIG. 6 is at some distance from the apparatus shown in FIGS. 2 or 3 and where it is then necessary to transmit the particular frequency signal over a relatively long pair of line wires, the grounding of the transformer center tap will present a balancing of each of the line wires with respect to ground. The function of the capacitors 62 and 63 is to prevent any direct-current charge on the line wires from entering the primary transformer winding and thus allowing all of the direct current supplied through resistor 98 to pass through the remote meter across wires 60 and 61; the function of resistor 64 which is connected from terminal 60 to ground will subsequently be described. The beat frequency input signal may, for example, have the wave shape shown at line A of FIG. 7.

The beat frequency signal appearing across the secondary winding of transformer T1 is filtered by the combination of resistor 65 and capacitor 66 and also by resistor 67 and capacitor 67a which remove high frequency spurious transients which may appear in the input signal. Resistor 65 also presents the proper load impedance to transformer T1 so that the transformer T1 will in turn present the proper load impedance to the line circuit. The resulting signal is then applied through coupling resistor 67 to the control grid of amplifier tube V1.

The amplified beat frequency signal appearing at the plate of tube V1 has a selected portion thereof, as determined by the setting of potentiometer 68, applied through a coupling capacitor 69 to the control grid of amplifier tube V3. The signal is also applied to the cathode of a limiter diode V2 which has its plate connected to the junction of resistors 70 and 71 connected in series between the (B—) terminal and ground. The voltage thus established at the plate of diode V2 fixes the lower base line of the voltage at the grid of tube V3 and each beat frequency cycle rises above this base line by the current of its peak-to-peak voltage swing.

Tubes V3 and V4 are interconnected to form a slightly modified Schmitt trigger circuit. The mode of operation of such a trigger circuit is well-known but has an added feature mentioned below. The trigger circuit remains normally in a condition wherein tube V4 is conductive and tube V3 non-conductive by reason of the cathode bias that is then effective on tube V3 because of the relatively large plate-cathode current of tube V4 flowing through the common cathode resistor 72. However, whenever the control grid voltage of tube V3 exceeds some predetermined minimum value, the trigger circuit is operated to the opposite state wherein tube V3 is conductive but tube V4 is cut off. When the grid voltage returns to a lower level, the trigger circuit is abruptly restored to its normal state. The Schmitt trigger circuit of FIG. 6 thus is operated through a complete cycle of operation for each positive half cycle of the beat frequency signal, provided only that the voltage goes sufficiently positive on such positive half cycle to go above the predetermined value required to operate the trigger circuit. In addition, it should be noted that the coupling capacitor from the plate of V3 to the grid of V4 has been added to increase the sensitivity of the Schmitt trigger circuit. This makes it unnecessary to connect a resistor from the grid of V4 to (B—) as is ordinarily done in a Schmitt circuit.

On the first few cycles of the beat frequency signal, when the vehicle is first entering the detection zone, the beat frequency signal ordinarily does not have sufficient amplitude to operate the trigger circuit. Thereafter, however, the trigger is operated once for each cycle, and continues to operate in a repetitive fashion until the beat frequency signal is restored to a quite low value as the vehicle moves out of the detection zone. As a result of this operation, there appears at the plate of tube V4 a substantially square wave of voltage for each cycle of the beat frequency signal as shown at line F of FIG. 7.

Each negative-going variation appearing in the voltage at the plate of tube V4 produces a negative-going trigger pulse at the cathode of tube V5 thereby producing a negative pulse at the grid of the normally conductive tube V6 which together with the associated tube V7 constitutes a one-shot multivibrator circuit. Normally, this multivibrator circuit rests in the condition where tube V6 is fully conductive since the control grid is connected through resistor 73 to the (B+) terminal. Each negative pulse at the grid of tube V6 causes tube V6 to cut off and this abruptly operates the multivibrator to the abnormal state wherein tube V6 is cut off but tube V7 is conductive. The length of time that the multivibrator remains in this abnormal state is dependent upon the time constant of the capacitors associated with the multivibrator. The time constant is preferably so selected that the multivibrator will remain in the abnormal state for a length of time that is less than the minimum period of the beat frequency signal even for high values of the beat frequency such as are encountered when vehicles pass through the detection zone at relatively high speeds.

The multivibrator comprising tubes V6 and V7 therefore produces a square wave negative-going output pulse at the plate of tube V7 for each triggering input applied to the multivibrator through diode V5 and with this voltage remaining at the low value for a fixed length of time which is independent of the beat frequency. Since the amplitude of each of these negative-going pulses is uniform, it may be said that there is applied to the grid circuit of amplifier tube V8 a series of pulses of constant area or constant energy content, one such pulse being applied for each beat frequency cycle.

The constant area pulses are amplified and inverted by amplifier tube V8 so that the plate output pulses which result appear as at line G of FIG. 7. It will be noted that the cathode of tube V8 is connected to a variable tap of potentiometer 74 which is connected between (B—) and ground. As a result, by varying the position of this tap, the average value of the voltage appearing at the plate of this tube may be varied although the amount of the peak-to-peak voltage swing resulting from each constant area grid pulse will not be substantially affected. Incidentally, because of the negative cathode voltage for the tube, the grid is connected through a resistor 75 to the (B—) terminal as well so that the proper grid-cathode bias may be obtained. The reason for providing a variable negative voltage on the cathode of tube V8 will subsequently be described.

The constant area pulses are applied through a resistor 76 to an integrating capacitor 77 which is conneced from the control grid of cathode follower tube V9 to ground. Capacitor 77 receives a uniform increment of charge for each such pulse but also tends, of course, to discharge between successive pulses when the anode potential of tube V8 is reduced to its normal negative value. Therefore, the potential to which this capacitor is eventually charged is directly dependent on the repetition rate of the charging pulses. This is indicated at line H of FIG. 7.

It will be noted at line H of FIG. 7 that the positive voltage across capacitor 77 declines steadily but slightly during the period that the square wave pulses occur. The reason for this can be attributed to the so-called "cosine factor." In other words, the angling of the sound beam with respect to the direction of travel of the vehicle means that the relative velocity of each vehicle with respect to the direction of the sound beam varies as the vehicle moves along the highway and through the sound beam even though the speed of the vehicle is constant. Referring particularly to FIG. 1A, it will be recognized that as the vehicle comes closer to the location of the transmitting and receiving transducers, its motion relative to the direction of the sound beam becomes somewhat less, even though the vehicle travels along the highway with a constant velocity, and this decrease in relative motion is what causes the beat frequency signal and thus the voltage across capacitor 77 to decrease by a small amount.

The voltage across capacitor 77 controls the amount of conduction of the cathode follower triode tube V9 and thus determines the amplitude of cathode voltage that is aplied to the plate of the charging diode V10. Before describing in a detailed manner how this positive voltage is effective to charge capacitor 78 connected between the control grid of cathode follower tube V11 and ground, it will be expedient to describe the operation of the remainder of the circuit and thereby establish the manner in which the relays R10 and R11 are controlled.

The beat frequency signal appearing at the plate of tube V1 is applied directly to an envelope detector which comprises in particular the diodes D1 and D2. It will be noted that the signal thus applied to the envelope detector is not subjected to any limiting action by means of diode V2 as is the signal obtained from tube V1 and applied directly to the grid of tube V3. The function of this envelope detector is to charge capacitor 80 to a voltage that is proportional to the amplitude of the envelope of the beat frequency signal. In other words, it is intended that the capacitor 80 have a voltage at its upper terminal which is closely related to the amplitude of the beat frequency signal rather than its frequency. The envelope detector circuit is of conventional form, the diode D1 preventing the voltage at its upper terminal from going below ground but becoming non-conductive whenever the voltage at its upper terminal rises above ground. This permits capacitor 80 to be charged through diode D2 by the full amount of the peak-to-peak amplitude of the beat frequency signal appearing at the plate of tube V1. The function of the filter comprising resistor 81 and capacitor 82 is merely to remove high frequency ripple that might be present in the voltage across capacitor 80.

The Schmitt trigger circuit comprising tubes V12 and V13 is generally similar to the trigger circuit already discussed and including tubes V3 and V4. The trigger circuit is not responsive, of course, to the amplitude of the individual beat frequency signals but is instead controlled by the amplitude of voltage appearing across capacitor 80. Normally, the trigger circuit rests in the condition wherein tube V13 is conductive and tube V12 is cut off. However, when the voltage at the grid of tube V12 rises sufficiently with respect to some predetermined threshold value, the trigger circuit will switch to the opposite state wherein tube V13 is cut off and tube V12 is conductive. The trigger circuit will remain in this state only as long as the voltage at the upper terminal of the capacitor 80 remains above some predetermined voltage. As soon as the voltage goes below this limit, the trigger circuit will abruptly be restored to its normal condition. The trigger circuit thus operates generally in the manner shown in line C of FIG. 7 as it responds to the voltage at the grid of tube V12 which is represented at line B of FIG. 7. Thus, the output voltage of the trigger circuit is shown as rising abruptly when the voltage at the grid exceeds a predetermined limit which limit is indicated at line B. The output voltage is abruptly lowered to its initial value when the grid voltage is decreased to another predetermined voltage level which, in this case, is less than that required to trigger the Schmitt trigger circuit initially. This lower threshold value is also shown at line B.

The output voltage of the Schmitt trigger circuit is applied to a one-shot multivibrator which includes the triode tubes V14 and V15. Normally, this multivibrator is in the condition wherein tube V15 is fully conductive and tube V14 cut off. However, when the output voltage of the Schmitt trigger circuit obtained from the plate of tube V13 rises abruptly in the manner first described, tube V14 is rendered conductive and this abruptly changes the state of the one-shot multivibrator so that tube V14 becomes conductive while tube V15 is rendered fully nonconductive. The length of time that the multivibrator remains in this condition is selected to be approximately 50 milliseconds. At the end of this time, the multivibrator is restored to its normal condition. Throughout the time that the multivibrator is in the normal condition, the plate current of tube V15 is effective to maintain relay R10 energized since the winding of this relay is in series with the plate-cathode circuit of tube V15. However, during the 50 millisecond interval that the multivibrator is in the opposite condition, relay R10 is dropped away as shown at line D of FIG. 7.

The plate voltage of tube V15 which is normally low because of the conduction of this tube goes abruptly positive during the 50-millisecond interval that tube V15 is non-conductive. Capacitor 83 is then charged through the grid-cathode circuit of tube V16 and through resistor 84, but this cannot appreciably affect the conductive condition of the already conductive tube V16 since the diode action of its grid-cathode circuit prevents the control grid from rising above the grounded cathode. However, when the multivibrator is restored to its normal condition at the end of the 50 millisecond interval, the voltage at the plate of tube V15 is restored to its normal low value and this causes the control grid of tube V16 to be immediately driven below cut-off so that relay R11 connected in its plate circuit is dropped away as shown at line E of FIG. 7. The time constant for the discharging of capacitor 83 is made sufficiently long so that tube V16 cannot become conductive again and pick up relay R11 for an interval of approximately one second.

As will subsequently become clear, the voltage across capacitor 78 connected in the grid circuit of tube V11 tends to maintain the charge which it received at the time of the passage of the last vehicle through the detection zone. However, during the 50 millisecond interval that relay R10 is dropped away, the back contact 85 of this relay is closed so that capacitor 78 can then charge (or discharge) to the new value of voltage then appearing at the cathode of the charging diode V10, and this voltage, of course, is proportional to the speed of the vehicle then within the detection zone since it is proportional to the frequency of the beat frequency signal. If the voltage now appearing at the cathode of diode V10 is greater than that which is at that time stored in capacitor 78, capacitor 78 can quickly charge to the new, higher value of voltage. On the other hand, if the new value of voltage at the cathode of diode V10 is lower because the vehicle then in the detection zone is traveling at a lower speed than the last monitored vehicle, then capacitor 78 can discharge through back contact 85, through front contact 86 of relay R11, and through resistor 87 to the (B—) terminal. Although a connection is thus provided from the upper terminal of capacitor 78 to the (B—) terminal, it is obvious that the voltage at the upper terminal of capacitor 78 cannot go below that appearing at the cathode of diode V10. The over-all result is, therefore, that, at the end of the 50 millisecond interval, capacitor 78 will be charged to a voltage which is proportional to the velocity of the vehicle which is at that instant within the detection zone since it will have become charged to a voltage substantially equalling that across capacitor 77. It is recognized that, because of the so-called "cosine factor" previously referred to, the voltage to which capacitor 78 can be charged is related to the time at which the sampling occurs, i.e., the time at which the charging or discharging of capacitor 78 is permitted to occur. However, from the description already given, it can be seen that this sampling interval is related to the wave shape of the beat frequency signal and only occurs when the beat frequency signal has reached some relatively high predetermined level. The result of this is that the sampling tends to occur for each vehicle when it is approximately at the same point in its travel through the detection zone, and this means that the voltage sampled will, for each car, be closely related to its actual velocity.

At the end of the 50 millisecond interval when relay R10 picks up, back contact 85 is opened so that the above-described charging circuit for capacitor 78 is opened. At this time, however, relay R11 drops away and closes back contact 86 of relay R11. This provides an alternative charging circuit for capacitor 78 so that it may still be charged to a higher level in the event that the voltage at the cathode of diode V10 should thereafter increase in value. Ordinarily, this is rather unlikely since the voltage tends to decrease as the vehicle progresses through the detection zone because of the aforementioned cosine factor. Therefore, an increase in the charging voltage at this time is ordinarily an indication that the vehicle speed itself has increased and it is desired to take this into account and thereby permit additional charging of capacitor 78 to take place. However, the opening of front contact 86 interrupts the discharging circuit and thereby prevents any decrease in voltage across capacitor 78 at this time. By this means, capacitor 78, although permitted to increase its voltage, cannot discharge and thus follow the voltage at the cathode of diode V10 as it tends to decrease in the ordinary manner.

The voltage across capacitor 78, of course, controls the amount of conduction in the cathode follower tube V11 and thereby determines the amplitude of the voltage which will appear at its cathode and thus also the amplitude of voltage that is applied through back contact 94 of relay R11 to the speed indicating meter 95. It is, of course, desirable that the reading of this meter 95 be zero when the heat frequency signal has zero frequency. This is accomplished by regulating the cathode voltage of tube V8 by an adjustment of the variable tap on potentiometer 74. In practice, this tap is adjusted so that the output voltage will read zero when there is no vehicle within the detection zone. Since the successive circuits from the plate of tube V8 to the output terminals are direct coupled, it can be readily appreciated that this variation of cathode potential will produce the desired meter calibration. Incidentally, relay R11 does not drop away and close its back contact 94 to permit energization of meter 95 until the end of the 50 millisecond interval provided for charging capacitor 78 to a voltage corresponding to the speed of the vehicle then moving within the sound beam. However, the meter reading of meter 95 is retained throughout the one second interval that relay R11 remains dropped away so that an observer has ample opportunity to note the meter reading.

The output voltage of cathode follower tube V11 is also used to charge a capacitor 96 in the grid circuit of tube V11a. The time constant for the charging of capacitor 96 is quite long so that the voltage across capacitor 96 does not closely follow the cathode voltage of tube V11 when that voltage varies appreciably for successive cars. Therefore, the voltage across capacitor 96 and the reading of meter 97 tends to read what may be designated as "flow velocity" rather than the speeds of individual vehicles and this reading is not displayed momentarily but steadily so that one can at any time ascertain the velocity of vehicular traffic.

Both the meters 95 and 97 may be ammeters having a relatively high resistance connected in series with the meter winding so that, in effect, a reading is obtained of the voltage appearing at the cathode of the associated cathode follower tube. In this connection, it will be noted that a connection is made from back contact 94 of relay R11, through resistor 98, to input terminal 61. The direct-current speed voltage is thus fed over the line wire connecting terminal 61 with terminal 18, for example, which is one of the output terminals of the circuit of FIG. 2. The resulting current flows through the secondary winding of the output transformer shown in FIG. 2 through the coil of meter 19, over the line wire connecting terminal 17 of FIG. 2 to terminal 60 of FIG. 6, and through resistor 64, to ground. The series resistance of resistors 98 and 64 is selected to equal that of resistor 99 in series with meter 95, and therefore meter 19 will record the same as meter 95. Thus, when the speed analyzer is at a central office, remote from the location of the apparatus of FIG. 2, a single pair of line wires may be used to transmit the beat frequency signal from the field location to the central office and also return the direct-current speed signal to the field location. This permits the speed information to be available in the field as well and facilitates the making of adjustments there. A similar result may be obtained when the terminals 60 and 61 are connected to the output of the circuit of FIG. 3.

If it is desired to provide a vehicle detection output in addition to speed data, contacts of either the relays R10 or R11 can be used since each of these relays will operate once for each passing vehicle. Therefore, it is entirely feasible to use a contact such as contact 90 of relay R10 and with this contact alternatively open or close a circuit between the output terminals 91, 92, and 93 in any desired manner.

*Speed analyzer circuit—FIGS. 8, 9, and 10*

In FIG. 8 is shown in block diagram form a speed analyzer circuit which may be used in place of the speed analyzer circuit of FIG. 6. A detailed circuit drawing of this alternative speed analyzer is disclosed in FIGS. 9A and 9B, and a wave form diagram illustrating the voltage wave forms that appear in various portions of the circuit is presented in FIG. 10.

This alternative speed analyzer circuit of FIGS. 8-10 differs in at least two important aspects from that previously described in connection with FIG. 6. It will be remembered that, in FIG. 6, the vehicle speed was measured by producing constant area pulses, one for each cycle of the beat frequency signal, and applying these to a charging capacitor with such capacitor being free to discharge between successive input pulses. As a result, the condenser became charged to a voltage which was directly related to the frequency of the constant area pulses, and this voltage was then sampled at a predetermined time to provide a direct measure of vehicle speed. In the alternative form of the invention, however, as shown in FIG. 8, what is done instead is to establish a gating interval which is of the same duration for each passing vehicle, and which is timed to start when the vehicle is in a particular position in the detection zone. During this predetermined interval, a gate is opened to permit square wave constant area pulses, one of each beat frequency cycle, to charge an integrating capacitor. Normally, the integrating capacitor is held in a discharged state by a discharge circuit, but this discharge circuit is not effective during the gating interval so that the integrating capacitor can only be charged at such time, receiving a uniform increment of charge for each square wave pulse. As a result, at the end of this predetermined time interval, the voltage across this capacitor represents the number of pulses which were applied to it during the interval, and this voltage is, of course, closely proportional to vehicle speed.

This alternative form of the invention also differs from that shown in FIG. 6 in that it is not the amplitude of the beat frequency signal which determines when the beat frequency signal shall be sampled in order to obtain speed data. Instead, the number of beat frequency cycles produced by a vehicle is, in effect, counted. After a predetermined number of the beat frequency cycles have been counted, the aforementioned predetermined interval is initiated. It will readily be appreciated that by thus counting the number of beat frequency cycles, car position is effectively determined. In other words, assuming that each vehicle is able to produce an effective reflection when a predetermined portion thereof has entered the detection zone defined by the transmitted sound beam, measurement of the cycles of the reflected signal is equivalent to measuring the distance that the vehicle has traveled from its initial entry into the detection zone. Thus, if a certain number of cycles must be counted before the previously predetermined interval can be initiated, this is equivalent to saying that the predetermined interval can be initiated only when the vehicle has reached a particular point in the detection zone. Therefore, by this system, the beat frequency signal provided by each moving vehicle is measured when that vehicle is at a particular point in the detection zone where it will provide an optimum beat frequency signal. Another advantage is that the previously-mentioned cosine factor error may be entirely compensated for since the error becomes a constant factor when vehicle speed is always measured when the vehicle is at the same location in the detection zone.

Referring to FIG. 8, the input signal which may have a wave form as shown at line A of FIG. 10 is applied to the input terminals 100 and 101 of the speed analyzer. The signal is applied through a grounded center tapped transformer to a cathode follower 102 and from there to both a limiter diode 103 and to a threshold adjuster 104. The function of the threshold adjuster 104 is to set the average level or D.C. value of the beat frequency signal which is applied to the Schmitt trigger circuit 105. When the beat frequency signal is first applied through the threshold adjuster to the Schmitt trigger circuit 105, its average or D.C. value is at a low level, but after the signal has been effective for a while, the Schmitt trigger 109 is operated and this applies a positive voltage over wire 110 to the threshold adjuster 104 and abruptly raises the average value of the input signal to the Schmitt trigger circuit. This ensures that the Schmitt trigger circuit 105 will be operated thereafter upon each cycle of the beat frequency signal even though the reflected signal might be momentarily diminished in amplitude so that it otherwise would not have a sufficient positive peak value to operate the Schmitt trigger circuit 105. The manner in which this threshold value is increased will shortly be explained in detail.

The successive positive half cycles of the beat frequency signal are each effective to operate Schmitt trigger 105 from its normal state to an opposite condition so that the output of the Schmitt trigger circuit comprises a square wave form having one cycle for each cycle of the beat frequency signal. This signal is applied through both the distance charging diode 106 and through the gate charging diode 107 to separate input terminals of the gate 108. Ordinarily, the gate 108 prevents the positive-going variations of the square wave pulses from the Schmitt trigger 105 from charging capacitor 111. However, after only a few cycles of the beat frequency signal, the gate charging diode 107 acts on gate 108 and permits the positive-going variations of the square wave pulses to charge capacitor 111. Only a few successive cycles of the beat frequency signal need be received before capacitor 111 starts to charge in response to the Schmitt trigger output pulses. Thus, as shown at line A of FIG. 10, only about three cycles of the Schmitt trigger circuit 105 output need occur before the gate charging diode 107 (see line D) will have acted upon the gate 108 to produce a sufficiently negative voltage therein to exceed the threshold value and thereby open the gate 108. The resulting operation of the gate is as illustrated at line E of FIG. 10.

When the relay circuits of the speed analyzer first respond to the beat frequency signal, capacitor 111 is fully discharged. Therefore, the same number of beat frequency cycles are required from each vehicle in order to charge capacitor 111 to the threshold value required to operate the Schmitt trigger circuit 109. Since one beat frequency cycle is produced for each predetermined amount of motion of the vehicle through the detection zone defined by the transmitted sound beam, the number of beat frequency cycles required to charge capacitor 111 to the threshold value represents a fixed distance of travel of the vehicle through the detection zone, i.e., from the moment when it first becomes effective to reflect a beat frequency signal to the receiving transducer and until the threshold value of the Schmitt trigger circuit 109 is reached. It is at this time that the predetermined measuring interval previously described is initiated (see line G, FIG. 10).

When the voltage level at the upper terminal of capacitor 111 is sufficient to operate the Schmitt trigger circuit, the output voltage of this trigger circuit rises abruptly and this increase of voltage is applied over wire 110 to raise the average level of D.C. voltage established by the threshold adjuster 104 for the beat frequency signal in the manner already described. At the same time, the positive-going variation occurring at the leading edge of the output pulse of Schmitt trigger 109 operates flip-flop 112 from its normal state to the opposite state where it remains until restored to its normal position by another input signal. The resulting output voltage of this flip-flop 112 is thus as shown at line H of FIG. 10.

This output voltage of flip-flop 112 is applied to the flow speed disconnect relay amplifier 113 and causes the relay FS controlled thereby to pick up. As shown at line I of FIG. 10, the relay FS is in its picked up condition for approximately the same length of time that the flip-flop 112 is in its abnormal state. Of course, because of the inertia of the relay armature, the relay actually picks up shortly after the flip-flop 112 first operates and then also drops away a short time after the flip-flop has been restored to its normal condition.

When relay FS picks up, the normally discharged capacitor 114 is charged through front contact 115 of relay FS. This applies a positive-going pulse to the condenser discharge circuit 116 which results in the dropping away of relay CD. This condenser discharge circuit 116 is a modified multivibrator circuit, and relay CD remains dropped away for a predetermined interval of time at the end of which the condenser discharge circuit is restored to its normal state thereby resulting in the picking up of relay CD. This operation of relay CD is shown at line K of FIG. 10. As soon as relay CD drops away, its back contact 117 closes to discharge capacitor 126 connected in the grid circuit of tube V26. This cancels, in effect, the speed signal still stored for the previous vehicle.

Restoration of relay CD to its normal picked up condition causes front contact 117 of this relay to close and this initiates operation of the one-shot multivibrator 118. The multivibrator 118 remains in its abnormal state for a predetermined length of time as shown at line L of FIG. 10. When it restores itself to the normal condition, an input is applied over wire 119 to the flip-flop 112, thereby restoring the flip-flop 112 to its normal state, as indicated at line H of FIG. 10. Throughout the period of time that the multivibrator 118 is in its abnormal state, it controls gate amplifier 123 to open gate 121, and the results accomplished by this will shortly become clear.

The beat frequency signal obtained from the output of cathode follower 102 is applied through limiter diode 103 to Schmitt trigger circuit 120. The function of the limiter diode 103 is to establish the base line of the beat frequency signal at a predetermined value, with each cycle causing the voltage to rise above the base line by the amount of the peak-to-peak voltage swing. The Schmitt trigger circuit 120 responds to each positive half-cycle of the beat frequency signal that is of sufficient amplitude to exceed the threshold value and it operates from the normal to an abnormal state for as long as the input voltage remains above a predetermined level. As a result, the output voltage of this Schmitt trigger circuit 120 has a wave form similar to that shown at line C of FIG. 10.

These square wave output pulses of the Schmitt trigger 120 are applied to the gate 121. Normally, this gate 121 cannot produce any output pulses in response to the input pulses; it is only when the gate 121 is receiving a positive enabling voltage from gate amplifier 123 in the manner already described that an output pulse will be produced for each input trigger obtained from Schmitt trigger 120. The output of this gate thus has the wave form shown at line M of FIG. 10, where it is shown that a pulse appears for each trigger pulse of line C but only throughout the time that the enabling bias is applied to gate 121.

Each trigger pulse from gate 121 is applied to one-shot multivibrator 122. The multivibrator 122 goes through a cycle of operations for each such square wave pulse, thereby providing output pulses which are of constant area regardless of the fact that the input pulses, although of square wave shape, may not all be of the same area.

The output pulses of multivibrator 122 are acted upon by the D.C. restorer which establishes their average value at a predetermined level and are also applied through a charging diode 125 to charge capacitor 126 whenever back contact 127 of relay M is closed. Since the ability to charge capacitor 126 is dependent on the condition of relay M, it is desirable to consider first the manner in which this relay is operated and some of the events which precede its operation. Thus, it has already been described that the picking up of relay FS results in the dropping away of relay CD. As previously mentioned, this discharges capacitor 126 because of the closure of back contact 117 thereby ensuring that this capacitor will always start with the same level of voltage across it so that at the end of the predetermined charging interval, its voltage will correspond to the number of pulses that had been received during such interval. In effect, therefore, the number of pulses received is counted by capacitor 126. Another result of the dropping away of relay CD is the closure of its back contact 129 which completes a discharge circuit for a capacitor associated with the relay amplifier 130. This causes the relay amplifier 130 to deenergize relay M as shown at line P of FIG. 10 so that relay M is dropped away for an interval of approximately one second. This means that relay M is actually dropped away prior to the beginning of the predetermined charging interval since that interval does not start until relay CD is again picked up. Therefore, contact 127 is closed well before the time that the first pulses are received from the one-shot multivibrator 122 and fed through the charging diode 125 for application to capacitor 126. Incidentally, it will be noted that upon the picking up of relay CD which initiates the charging interval, the connection from ground to the upper terminal of capacitor 126 is interrupted so that no further discharging of capacitor 126 can thereafter occur as capacitor 126 is being charged. The reason that relay M is permitted to remain in its dropped away condition for as long as one second is that this makes it possible for the meter 131 to remain energized through back contact 210 for a relatively substantial length of time in response to the output voltage of the cathode follower 132. This output voltage is, of course, proportional to the voltage across capacitor 126 and therefore the deflection of the indicator on meter 131 can be made to represent directly the velocity of the last vehicle to go through the detection zone. By maintaining this reading for an interval of one second, it is possible for an observor to note the meter reading.

The speed voltage output of cathode follower 132 is also applied through back contact 211 and resistor 212 to a capacitor 213 which is connected in the input circuit of cathode follower 214. The output of this cathode follower energizes meter 215. This circuit operates in almost exactly the same manner as does the corresponding circuit of FIG. 6 which is provided there for control of meter 97 and which includes tube V11a. Meter 215 therefore reads vehicle "flow speed" rather than the speed of each individual vehicle. The function of back contact 211 of relay FS is to disconnect capacitor 213 from the output of cathode follower 132 during the time that capacitor 126 is being discharged and then recharged with a new voltage representing the speed of the vehicle then in the detection zone.

Referring now to the detailed circuits of the speed analyzer shown in FIGS. 9A and 9B, the beat frequency signal which may be obtained from a circuit organization such as that shown in FIGS. 2 or 3 is applied to the input terminals 100 and 101 which connect directly to the primary winding of transformer T2 whose center tap is grounded. The voltage induced in the secondary winding is applied through a series grid resistor 142 to the control grid of cathode follower tube V17. The function of capacitor 143 connected between the control grid and ground is merely to remove high frequency interference, but has substantially no effect upon the beat frequency. The cathode of tube V17 is connected through resistor 144 to the (B—) voltage terminal.

The resulting beat frequency signal that appears across load resistor 144 is applied through a coupling capacitor 145 and through resistor 146 to the control grid of tube V29 which is interconnected with a corresponding triode tube V30 to form Schmitt trigger circuit 105. The lower terminal of capacitor 145 is also connected through resistor 147 to a tap on potentiometer 148. The upper terminal of this potentiometer is connected to the cathode of a triode tube V28 and also through a fixed resistor 149 of the (B—) source of voltage. Tube V28 is normally in a non-conductive state because the voltage normally applied to its control grid is more negative than the cathode voltage which is derived from the voltage divider comprising resistor 149 and potentiometer 148 connected between (B—) and ground. With tube V28 thus non-conductive, direct-current voltage at the lower terminal of capacitor 145 is substantially negative. This means that the base line of the beat frequency signal applied to the control grid of tube V29 is also substantially negative. Therefore, it is only on those cycles of the beat frequency signal which are of substantial amplitude such that the peak of the positive half-cycle will exceed the threshold level for operating Schmitt trigger 105 that tube V29 will be rendered conductive and tube V30 conductive.

After the beat frequency signal has been effective for some time to operate Schmitt trigger 105 on successive cycles, it can thus be assured that the received signal is a bona fide reflection signal rather than merely a spurious interfering signal, and thus the voltage on wire 110 is raised sufficiently to cause tube V28 to become conductive. When this happens, there is a flow of current from the negative cathode and through the plate resistor 151 to ground which raises the direct-current voltage at the tap on potentiometer 148. This results in an abrupt rise in the average value of the beat frequency signal in the manner shown at line B of FIG. 10 so that even those beat frequency cycles which are of lower amplitude now will still trigger Schmitt trigger 105. The over-all operation of this circuit, therefore, is such that a fairly substantial amplitude of beat frequency signal is required to produce operation of the Schmitt trigger circuit initially, but when the Schmitt trigger circuit has operated for a few cycles in response to the beat frequency signal, its sensitivity is suddenly increased markedly so that there can be short intervals during which the beat frequency amplitude may go to quite low values, even substantially below those which were initially required to operate Schmitt trigger 105, and yet not fail to operate it.

Schmitt trigger 105 operates for each cycle of the beat frequency signal providing that the conditions already described with respect to amplitude are met. Normally, this Schmitt trigger circuit rests in the condition where tube V30 is fully conductive and tube V29 cut off. However, each positive half cycle of the beat frequency signal reverses the relative conductive conditions of these tubes so that tube V30 will become non-conductive and remain non-conductive for as long as the grid-cathode voltage of tube V29 remains above the threshold operating level for this trigger circuit. The result then of the operation of this trigger circuit is to provide a positive-going, square wave output voltage pulse for each beat frequency signal.

The function of the circuit comprising diode V31 is to place a small increment of charge on capacitor 111 for each square wave output pulse of the Schmitt trigger 105 so that the voltage at its upper terminal will be closely proportional to the number of beat frequency cycles that have occurred in response to the vehicle then passing through the detection zone. Since one beat frequency cycle occurs for a predetermined distance of travel of a vehicle through the detection zone defined by the transmitted sound beam, it follows that the voltage across capacitor 111 will represent the distance that has been traveled by the vehicle since it first entered the sound beam and first became effective to produce the beat frequency signal. Essentially, this portion of the circuit operates by means of a charging circuit which includes the coupling capacitor 153 and diode V31. Each positive-going variation occurring upon the leading edge of an output pulse at the plate of tube V30 charges capacitor 153 and causes the plate of diode V31 to become positive with respect to the cathode of this tube and thus attempts to place an increment of charge on capacitor 111 subject to the control exercised by tube V33 as will be described.

It is, of course, necessary that for each vehicle entering the detection zone, capacitor 111 start with the same level of voltage across it since otherwise the voltage to which the capacitor is charged cannot truly represent the number of beat frequency cycles that have occurred. It is also necessary that the capacitor 111 not be charged as a result of any spurious operations of Schmitt trigger 105 which might occur as a result of an intermittent beat frequency cycle which is of sufficient amplitude to exceed the threshold level of Schmitt trigger 105 and thus momentarily cause tube V30 to become non-conductive. These requirements are met by providing an additional charging circuit which responds to the output pulses of tube V30 and prevents capacitor 111 from receiving any charge until a few successive cycles of signal have been received.

This additional circuit is termed the gate charging diode circuit 107 of FIG. 9 and comprises a diode V32 which controls the charging of a capacitor 154 connected between the control grid and cathode of triode tube V33. Described briefly, the capacitor 154 is normally discharged so that tube V33 is conductive, thereby preventing capacitor 111 from being charged since the conducting tube V33 in effect places a low impedance shunt across capacitor 111. However, the occurrence of several successive output pulses from tube V30 of the Schmitt trigger circuit will negatively charge capacitor 154 and thereby render tube V33 non-conductive. When this happens, the effective low impedance shunt across capacitor 111 is removed so that each charging pulse applied through diode tube V31 can be effective to charge capacitor 111.

The control grid circuit of tube V33 includes a coupling capacitor 155 which connects the plate of tube V30 to the cathode of diode V32. A biasing network for both the cathode and plate of diode V32 is provided by a voltage dividing network which comprises a resistor 156 and a gas-filled voltage regulator tube VR connected in series between the (B—) terminal and ground. The voltage regulator tube is of the conventional type which provides a constant voltage drop across its terminals with the result that there is a constant voltage of approximately —100 volts available at its upper terminal. This negative regulating voltage is applied through a resistor 157 to the cathode of diode V32.

A voltage dividing circuit comprising the series resistors 158 and 159 is connected between the upper terminal of tube VR and ground, and the relative values of these two series resistors is so selected that the voltage at their junction is slightly less than that appearing at the upper terminal of tube VR and, in one specific embodiment of this invention, this voltage was selected to be —90 volts. This voltage at the junction of the resistors 158 and 159 is applied through resistor 160 to the plate of diode V32. Negative regulated voltages are thus applied to the cathode and plate of diode V32, but the cathode is normally more negative than the plate so that the diode V32 is biased to be normally slightly conductive and will thus readily respond by conducting additional current whenever its cathode is made even more negative than the plate.

The voltage at the plate of diode V32 is also that which is applied to the control grid of tube V33 and thus also to the upper terminal of capacitor 154. On the other hand, the cathode of tube V33 and the lower terminal of capacitor 154 are connected to the somewhat more negative voltage appearing at the upper terminal of tube VR. This ensures that tube V33 is normally in a conductive condition and capacitor 154 has a slightly positive charge. With tube V33 conductive in this manner, it is of course impossible for capacitor 111 to become charged as the result of an operation of Schmitt trigger 105. Therefore, intermittent operations of the Schmitt trigger circuit, such as may periodically occur as a result of noise or by the reception of spurious beat frequency signals, can produce no effect upon the voltage across capacitor 111.

When a vehicle enters the detection zone and produces repetitive output pulses from Schmitt trigger 105, each negative-going voltage variation at the plate of tube V30 drives the cathode of diode V32 substantially negative with respect to the plate so that capacitor 154 receives an increment of charge. If such trigger pulses occur only at random intervals, the negative charge thus acquired by capacitor 154 will quickly discharge through the resistor 160 before the occurrence of the next pulse so that tube V33 will not become and remain non-conductive. However, when tube V30 provides these square wave pulses repetitively as when a vehicle is passing through the detection zone, when an increment of charge is added to capacitor 154 for each cycle. The values of the circuit component are so selected that only about two or three successive square wave pulses from tube V30 need occur to establish sufficient negative charge on capacitor 154 to drive the control grid of tube V33 beyond cut-off (see FIG. 10, lines D and E).

When tube V33 cuts off, capacitor 111 connected between its plate and ground can become responsive to the positive charging pulses it then receives through diode V31. Incidentally, it will be noted that the plate of diode V31 is connected through a rectifier 161 to the upper terminal of voltage regulator tube VR and this establishes at a fixed level the lower limit of the positive-going voltage pulses which appear at the plate of this diode V31. Since the successive trigger pulses are of substantially uniform amplitude as well, a uniform increment of change is added to capacitor 111 for each beat frequency cycle. The voltage on capacitor 111 is thus closely related to the number of such pulses which have been received (see line F, FIG. 10), and is therefore also proportional to the distance traveled by the vehicle subsequent to its entry into the detection zone.

Schmitt trigger circuit 109 comprising tubes V34 and V35 is similar to those previously described so that its normally non-conductive tube V34 becomes conductive and remains so for as long a time as its grid voltage is above the threshold operating value. When Schmitt trigger 109 has thus operated, its normally conductive tube V35 becomes non-conductive so that the voltage it its plate abruptly rises in value as indicated at line G of FIG. 10. It is this rise in voltage which is applied through resistor 162 to wire 110 for the purpose of raising the threshold value of the input to Schmitt trigger 105.

The output voltage of tube V35 is also applied through a capacitor 163 to the control grid of tube V36 which is included with tube V37 in a conventional flip-flop circuit. Normally, this flip-flop rests in the condition with tube V36 non-conductive and tube V37 conductive. However, the positive-going voltage variation appearing at the plate of tube V35 when this Schmitt trigger circuit is operated causes the flip-flop to operate to the state wherein tube V36 is conductive and tube V37 is cut off. Therefore, there is an abrupt rise in potential at the plate of tube V37 as is indicated at line H of FIG. 10. This increase in plate potential overcomes the normal cut-off bias of tube V38 so that relay FS connected in its plate circuit is picked up as shown at line I of FIG. 10. The time of operation of this relay is somewhat delayed with respect to the operation of the flip-flop circuit because of the mechanical inertia of the relay armature.

When relay FS picks up, movable contact 115 of this relay which is normally connected to ground is connected instead to the (B+) terminal. The normally discharged capacitor 114 is then quickly charged so that a rise in voltage is experienced at the control grid of tube V39. Tubes V39 and V40 are interconnected in a one-shot multivibrator circuit with the two tubes being coupled together through the common cathode coupling circuit. Throughout the predetermined time interval that tube V40 is cut off, relay CD connected in its plate circuit is dropped away. This operation of the condenser discharge circuit and associated relay CD is graphically illustrated at lines J and K of FIG. 10.

Upon the dropping away of relay CD, back contact 117 of this relay is closed thereby connecting wire 169 to ground. This has the effect of discharging capacitor 126 which is connected in the grid circuit of cathode follower tube V26. As will later be described in detail, capacitor 126 is charged for each vehicle with a voltage representing the speed of that vehicle, and the purpose of discharging this capacitor at the time relay CD drops away is to ensure that the voltage corresponding to the measured speed of the last vehicle is removed from this capacitor beforer applying to it the voltage representing the speed of the car then moving through the detection zone.

Another result of the dropping away of relay CD is the closure of its back contact 129 which connects the (B—) potential source through resistor 187 to the control grid of tube V27. Normally, the control grid of this tube is substantially at the potential of its grounded cathode, since the control grid is connected through resistor 188 to the junction of voltage dividing resistors 189 and 190 connected between (B+) and ground. However, the placing of the negative potential on wire 191 causes capacitor 192 to receive a substantial negative charge and this immediately cuts off tube V27 and thereby drops relay M away, as shown at line P of FIG. 10. After a brief interval, where relay CD again picks up and opens its front contact 129, tube V27 remains non-conductive for a substantial length of time thereafter since the time constant for the discharge of capacitor 126 is made quite long. In fact, it has been found desirable in practice to provide a sufficiently long time constant to ensure that tube V27 will remain dropped away for as long as one second. As shown at line P of FIG. 10 this one-second interval during which relay M is dropped away completely embraces the predetermined charging interval established by gate amplifier 123 and extends for a substantial time thereafter as well.

When condenser discharge circuit 116 again picks up relay CD, wire 171 is grounded and this provides an input to one-shot multivibrator 118 comprising tubes V41 and V42 which results in a reversal of the conductive states of these two tubes. Tube V42 is normally the conductive tube of this multivibrator since its control grid is connected through resistor 172 to (B+). During the predetermined time that this multivibrator remains in its abnormal state with tube V42 non-conductive and tube V41 conductive, a lower than normal voltage is applied to the control grid of gate amplifier tube V43 so that this normally conductive tube becomes non-conductive.

More specifically, tube V43 is normally conductive since its cathode is connected to the upper terminal of voltage regulator tube VR and this voltage is in the order of −100 volts, but the plate of the tube is connected through resistor 175 to the junction of voltage dividing resistors 176 and 177, connected in series between (B—) and ground. Since the plate of tube V43 is thus considerably more positive than the cathode and since the control grid is connected to a relatively high source of potential at the plate of tube V41, tube V43 is normally conductive so that there is a substantial voltage drop across resistor 175 in the screen grid circuit of tube V21. This voltage drop so lowers the screen grid potential that tube V21 cannot conduct. However, during the time that the one-shot multivibrator 118 is in the condition wherein tube V41 is conductive, there is a substantial decrease of grid voltage of tube V43 so that this tube becomes non-conductive and thereby permits the screen grid potential of tube V21 to rise. Tube V21 can therefore conduct through its plate-cathode circuit in a manner to be presently described.

The beat frequency signal appearing across cathode resistor 144 of tube V17 is also applied through a coupling capacitor 178 to the cathode of the limiter diode V18. The plate potential of this tube is established by the voltage divider in its plate circuit comprising resistors 179 and 180 connected in series between (B—) and ground. The effect of the limiter is to establish the lower base line of the voltage above which the beat frequency signal variations take place. The resulting beat signal cycles are then applied directly to the control grid of tube V19 which is interconnected with tube V20 to form another Schmitt trigger circuit 120.

The output of this Schmitt trigger circuit also comprises positive-going square wave pulses whose general wave shape is as shown at line C of FIG. 10. These are applied through a capacitor 181 to the plate of a tetrode tube V21. The two grids of this tube V21 provide independent gating voltages to control its conduction. Assuming that both of these gating voltages are present, each positive-going leading edge of an output pulse from tube V20 produces a corresponding trigger pulse at the cathode of tube V21 which is then applied to the control grid of tube V22 included in the one-shot multivibrator. Thus, for each beat frequency cycle, the one-shot multivibrator goes through a cycle of operation, going for a time to the abnormal state wherein its normally conductive tube V23 is non-conductive and then restoring itself shortly thereafter to the normal condition. The cycle of operation of the multivibrator is chosen so that the tube V23 remains in the abnormal state for a time which is less than the period of the maximum beat frequency signal that would be encountered for high speed vehicles. Therefore, this multivibrator 122 provides constant area square wave pulses, one for each beat frequency cycle.

Each time that multivibrator 122 restores itself to its normal condition, a negative-going variation is applied through capacitor 182 to the control grid of tube V21. This has the effect of cutting off tube V21 and thereby preventing the multivibrator from immediately being operated again by any spurious output that might be obtained at the plate of tube V20. The time constant for the discharge of capacitor 182 is relatively short so that tube V21 will have its normal grid voltage restored prior to the occurrence of the next bona fide output signal from tube V20, even for those conditions where a vehicle is moving at high speed so that the next pulse will occur relatively soon.

The effect of the one-shot multivibrator 122 is to provide a positive-going square wave pulse for each output pulse obtained from Schmitt trigger 120. Although the output pulses from the Schmitt trigger circuit may vary in duration, dependent upon the frequency of the beat frequency signal, the successive output pulses provided by the multivibrator are all of the same duration. Since their amplitude is also constant, the resulting pulses are of constant area and thus of constant energy, and each is thus able to provide the same increment of charge through charging diode V25 to the capacitor 126. Tube V24 is the D.C. restorer and operates in a conventional manner to establish the direct-current level of the pulses which appear at the plate of tube V25. One difference with respect to the operation of D.C. restorer 124, however, is that its plate is not connected directly to a source of fixed voltage such as the tap of a voltage divider but is instead connected to the junction of resistors 183 and 184 in the cathode circuit of tube V26. The effect of this connection is to provide equal increments of charge to capacitor 126 from successive cycles instead of successively reduced increments of charge which would be obtained if the anode of V24 were connected to a fixed potential.

The circuit connection between the cathode of diode V25 and the control grid of triode tube V26 includes back contact 127 of relay M. As already described, relay M is dropped away to permit the charging of capacitor 126 prior to the occurrence of the charging pulses and remains dropped away for perhaps a second thereafter. From the description already given, it will be clear that capacitor 126 will be charged for each vehicle to a voltage that is directly dependent on the number of output pulses provided by gate 121 during the predetermined interval that tube 121 is permitted to conduct.

The output voltage at the cathode of tube V26 is, of course, nearly equal to that appearing across capacitor 126. A voltage divider is connected from the cathode of tube V26 and this voltage divider comprises resistors 195 and 196 as well as potentiometer 197. The voltage at the junction of resistors 195 and 196 is applied through closed back contact 198 of relay M and through meter 199 to ground. For the one-second interval, therefore, that relay M is dropped away, a voltage is applied to the meter 199 which is proportional to vehicle speed and the scale of this meter may of course be calibrated so as to read vehicle speed in miles per hour.

Another voltage dividing circuit is included between the cathode of tube V26 and ground and this voltage divider comprises resistors 200 and 201 as well as the common potentiometer 197. A voltage is thus provided at the junction of these two resistors 200 and 201 that is also proportional to vehicle speed, and this voltage is applied through closed back contact 202 of relay FS and through resistor 203 to the control grid of tube V43. Capacitor 204 connected between the control grid of tube V43 and ground can thus be charged to this output voltage which represents vehicle speed and the result is that the meter 205 connected in the cathode circuit of tube V43 will also read the speed of vehicles.

The input circuit to tube V43 does not, however, contain any contact of relay M so as to limit to an interval of a second or so the time during which vehicle speed is displayed by meter 205. Instead, normally closed contact 202 of relay FS is included in the grid circuit. As shown in FIG. 10 at line I, relay FS is picked up before relay CD drops away and discharges capacitor 126. This means that capacitor 204 is disconnected from the output circuit of cathode follower tube V26 prior to the discharge of capacitor 126 and for this reason capacitor 204 retains the charge which represented the speed of the last vehicle and does not discharge in the intermediate interval between successive vehicles when capacitor 126 is discharged. Back contact 202 of relay FS is not closed again until flip-flop 112 is restored to its normal condition, and this does not occur as shown in FIG. 10 at line 4, until the end of the predetermined charging interval (see line L). At such time, the restoration of multivibrator 118 applies a negative-going pulse from the plate of tube V42 to the plate of tube V37 and thence to the control grid of tube V36 to restore flip-flop 112 and this results in the dropping away of relay FS. The circuit to the upper terminal of capacitor 204 is thus not closed again until after capacitor 126 has become charged to a new voltage value corresponding to the speed of the last-monitored vehicle. Thereafter, capacitor 204 can become charged to a different voltage which then represents the voltage obtainable at the cathode of tube V26.

In actual practice, since it is desired that meter 205 read what may be termed a "flow velocity" rather than the speed of an individual vehicle, the charging capacitor for circuit 204 is adjusted to have a relatively long time constant so that the voltage across capacitor 204 will vary only slowly between successive vehicles. In other words, even though the last-monitored vehicle may have a vehicle speed which is appreciably different from the immediately preceding vehicle, the voltage on capacitor 204 will change only gradually in response to this change of vehicle speed. Of course, if there are no vehicles following shortly after the passage of the vehicle with the appreciably different speed, then capacitor 204 will eventually become charged to a voltage level corresponding to such appreciably different speed. Also, if a number of succeeding vehicles all have the appreciably different vehicle speed, then capacitor 204 will eventually reach the voltage level which corresponds to that different speed, but it will not immediately follow the individual speed changes for the respective vehicles. In this way, meter 205 will not abruptly vary its reading for every passing vehicle but will vary only gradually in accordance with variations in flow velocity.

From the description already given, it will be apparent that a vehicle speed measuring system may be organized by connecting the output of the circuit of FIG. 2 to the input of either the speed analyzer of FIG. 6 or that of FIG. 9. Alternative embodiments of the invention comprise those wherein the circuit of FIG. 3 is combined with the speed analyzer of FIG. 6 or of FIG. 9.

It will further be apparent that various alternatives may be employed in place of the specific means disclosed herein. Thus, the broader concept of the invention may be said to comprise, in part, a vehicle speed measuring system which is directionally responsive and which comprises a method wherein sound energy of a predetermined frequency is transmitted toward vehicles moving in either of two generally opposite directions, with the direction of sound travel having a substantial component parallel to the direction of vehicle movement, receiving reflections of the transmitted sound from the moving vehicles, converting the reflected sound energy to electrical energy, filtering the resulting electrical energy so as to segregate signals lying to one side of the frequency of the transmitted signal from those lying to the other side of such frequency, and measuring the extent of the frequency shift of the resulting signal which is derived after filtering so as to obtain a measure of vehicle speed. The invention also may be considered as comprising in part a method for deriving speed data from a beat frequency signal which includes the steps of counting the number of beat frequency cycles, demarcating a fixed interval which starts after a predetermined number of beat frequency cycles have been counted and counting the number of beat frequency cycles that occur during such fixed interval, thereby obtaining a measure of vehicle speed. Alternatively, the invention comprises a method of obtaining speed data from a beat frequency signal which includes the steps of producing electrical pulses of relatively uniform energy content with one such pulse being provided for each beat frequency cycle, integrating such pulses with respect to time to thereby obtain an analog whose amplitude is proportional to vehicle speed, and energizing a speed indicator with said analog when the amplitude of the beat frequency signal has been determined as being above some predetermined minimum level.

In the embodiment of the speed analyzer shown in FIG. 9, the predetermined time interval which is demarcated is initiated only after an intergrating capacitor has been charged to some predetermined level as a result of receiving a succession of voltage pulses, one of which is provided for each beat frequency cycle. It may thus be considered that an analog counting operation takes place whereby the amplitude of voltage provided by the integrating circuit represents the number of beat frequency cycles that have occurred. It will be clear to one skilled in the art that it is also practical to employ a digital rather than analog type of counting circuit. In other words, a digital counter may be employed which will count the number of beat frequency cycles and initiate the predetermined timing interval only after a selected number of beat frequency cycles have been counted. The analog counting which is done in the embodiment of the invention shown in FIG. 9 is considered preferably, however, because of its comparative simplicity.

Having shown and described a vehicle speed measuring and detection system, including alternative embodiment thereof, we wish it to be understood that the specific emobdiments shown are merely illustrative of the principles of this invention, and it is to be understood that our invention is not to be limited to the specific forms shown but only by the appended claims.

What we claim is:

1. In a system for selectively measuring the speeds of vehicles moving in either of two generally opposite directions through a detection zone defined by a beam of sound energy directed with a substantial component generally parallel to the direction of travel of said vehicles the combination comprising, means for transmitting said sound energy with a predetermined frequency, receiving means for receiving said sound energy following its reflection from said vehicle with its frequency shifted to one side or the other of said predetermined frequency according to the direction of travel of said vehicle and by an amount proportional to the component of vehicle velocity parallel to the direction of said sound beam, said receiving means including means for converting said received sonic energy to an electrical signal having frequency components corresponding to those in the reflected sonic energy, said receiving means also including filtering circuit means having said electrical signal applied thereto and being tuned to pass those frequency components which have been doppler shifted in a particular direction with respect to said predetermined frequency and resulting from the passage through said detection zone of a vehicle moving in a selected one of said two opposite directions, and measuring means distinctively controlled by the output of said filtering means according to the amount of the frequency shift of the reflected signal relative to said predetermined frequency for giving a distinctive indication of vehicle speed.

2. The speed measuring system of claim 1 wherein said receiving means also receives a portion of the transmitted signal and said filtering means is tuned to pass also said predetermined frequency of said transmitted signal, said receiving means also including mixing means for heterodyning the output frequencies of said filtering means and further including additional filtering means tuned to pass only the difference frequency of said heterodyned frequencies, said measuring means including means controlled distinctively by said difference frequency for measuring the speed of said vehicle.

3. The speed measuring system of claim 1 wherein said filtering means is tuned to reject also said predetermined frequency, said receiving means includes mixing means receiving both the output of said filtering means and a predetermined portion of the transmitted signal for producing both sum and difference frequencies, said receiving means also includes additional filtering means tuned to pass only the difference frequency of the signals applied to said mixing means, and said output means includes means controlled according to the amount of said difference frequency signal provided by said additional filtering means to thereby measure the speed of said vehicle moving in a particular direction through said detection zone.

4. A directional detector for selectively detecting the passage only of those vehicles moving in a particular one of two opposite directions through a detection zone defined by a beam of sound energy transmitted with at least a substantial component parallel to the direction of travel of said vehicles and comprising, transmitting means for transmitting said sound beam with a preselected frequency, receiving means receiving reflections of said sound beam from vehicles moving through said detection zone with the reflected energy undergoing a Doppler frequency shift and converting the received sonic energy to an electrical signal having frequency components corresponding to those in the reflected sonic energy, output circuit means distinctively controlled by the application of an input signal thereto for indicating the passage of a vehicle in a particular direction through said detection zone, frequency responsive means coupled between said receiving means and said output means and including tuned circuit means which is tuned to pass a band of frequencies including those reflected signals received by said receiving means whose Doppler frequency shift is in the direction with respect to said transmitting frequency resulting from vehicles moving in said particular direction but to discriminate against the corresponding band of Doppler-shifted frequencies resulting from vehicles moving in the opposite direction.

5. A directional detector for selectively detecting the passage of vehicles moving in either of two generally opposite directions through a detection zone defined by a sound beam having at least a substantial component thereof which is parallel to the direction of travel of said vehicles and comprising, transmitting means for transmitting said beam of sound energy with a preselected frequency, receiving means receiving the reflections of said sound beam from vehicles moving through said detection zone with the reflected energy having a Doppler frequency shift from said preselected frequency in a direction dependent upon the direction of travel of the respective vehicle, first and second output circuit means corresponding respectively to the opposite directions of travel of said vehicles and each being distinctively controlled by the application of an input signal thereto for indicating the passage of a vehicle in a respective direction through said detection zone, first frequency responsive means being coupled between said receiving means and said first output means for supplying an input signal to said first output circuit means only for output signals of said receiving means whose frequency is higher than said predetermined frequency, whereby the passage of a vehicle in a direction toward the transmitting means is detected, second frequency responsive means being coupled between said receiving means and said second output circuit means for supplying an input signal to said second output circuit means only for output signals of said receiving means which are lower in frequency than said transmitted frequency, whereby the passage of a vehicle through said detection zone in a direction away from said transmitting means is detected each said frequency responsive means including filter circuit means tuned to pass a band of frequencies which includes the Doppler shifted frequencies shifted in the direction corresponding to the direction of vehicle travel associated with the respective frequency responsive means and tuned to discriminate against the Doppler shifted frequencies lying on the opposite side of said preselected frequency.

6. In a system for selectively measuring the speeds of vehicles according to their direction of travel as they move in either of two generally opposite directions the combination comprising, transmitting means including a transmitting transducer positioned and directed to transmit a beam of sound energy in a direction having at least a substantial component parallel to the direction of vehicle travel, receiving means including a receiving transducer positioned and directed to receive reflections of said sound beam from each said vehicle, whereby vehicles moving in one of said directions produce a first reflected signal having its frequency shifted in one particular direction with respect to said transmitted frequency and vehicles going in the opposite direction produce a second reflected signal having its frequency shifted in the opposite direction from said transmitted frequency, filter circuit means connected to said receiving means and tuned to produce an alternating-current output signal only in response to reflected signals shifted in said one particular direction and not the other, and means distinctively controlled by said output signal of said filter circuit means to indicate the speed of vehicles moving only in said one direction.

7. The speed measuring system of claim 6 which further includes mixing means connected to said filter circuit means for heterodyning a signal having a preselected frequency with said one reflected signal having its frequency shifted in said one particular direction to thereby obtain beat frequency signals whose frequency is proportional to vehicle speed, said output means also including a filter tuned to pass the difference frequency of the output of said mixing means and to discriminate against the remaining frequency components in the output of said mixing means.

8. Apparatus for producing an electrical signal only in response to a vehicle moving in a selected one of two generally opposite directions through a zone defined by a beam of sonic energy impinging upon and reflected from the sonic reflective surfaces of said vehicle comprising, means for transmitting said sonic energy with a preselected frequency and in a direction having at least a substantial component in the direction of vehicle travel, means for receiving a portion of said energy upon its being reflected from said sonic reflective surfaces of each said vehicle having frequency characteristics corresponding to those of the reflected sound energy, said reflected sonic energy having a Doppler frequency shift either above or below said preselected frequency in accordance with whether said vehicle is moving toward or away from said transmitting means, said receiving means including frequency responsive means having the Doppler frequency shifted reflection signal applied thereto and being tuned to provide an output signal only in response to a received signal which has been shifted to one particular side of said preselected frequency and not to the other side, and output means responsive to the signal provided by said frequency responsive means.

9. Apparatus for measuring the speed of an automotive vehicle moving in a particular direction along a defined lane comprising, means for transmitting a beam of sound energy of predetermined frequency with a substantial component parallel to the direction of movement of said vehicle and with said beam substantially confined to said lane, means for receiving a portion of said sound energy upon its reflection from said vehicle, said transmitting and receiving means being so positioned and directed that said sound energy impinges upon the windshield of each vehicle moving in said particular direction toward said transmitting means and is reflected therefrom to said receiving means, means responsive to said predetermined frequency of the transmitted signal and to the frequency of the Doppler-shifted reflection signal received by said receiving means for producing a beat frequency signal having its frequency at each instant proportional to the speed of said vehicle as it intercepts and reflects said beam, said frequency responsive means including filter circuit means tuned to discriminate against those frequency components resulting from vehicle reflection signals shifted downwardly with respect to said predetermined frequency by vehicles receding from the location of said transmitting means, whereby said frequency responsive means produces an output signal representative of the speed of a vehicle only for vehicles moving in said particular direction and reflecting said sound energy toward said receiving means, and means responsive both to the frequency of said output signal of said frequency responsive means and to its amplitude for registering the speed of said vehicle only in accordance with the frequency attained by said output signal throughout the time of substantially maximum amplitude of said reflection signal from the windshield of said vehicle, whereby any vehicle intercepting said sound beam while travelling in a direction opposite to said particular direction does not have its speed registered and any vehicle passing in said particular direction through said beam is registered only if it passes along said defined lane so as to intercept and reflect said sound beam from its windshield.

10. In a system for selectively measuring the speeds of vehicles moving in a predetermined one of two generally opposite directions through a detection zone defined by a beam of sound energy directed with a substantial component generally parallel to the direction of travel of said vehicles the combination comprising, means for transmitting said sound energy with a predetermined frequency, receiving means for receiving said sound energy following its reflection from said vehicle with its frequency shifted to one side or the other of said predetermined frequency according to the direction of travel of said vehicle and by an amount proportional to the component of vehicle velocity parallel to the direction of said sound beam, said receiving means including means for converting said sonic energy to an electrical signal having frequency components corresponding to those in the reflected sonic energy, a carrier notch rejection filter having said electrical signal applied thereto and tuned to supress said predetermined frequency but to pass frequencies to either side of said predetermined frequency, a band-pass filter receiving the output of said carrier notch rejection filter and tuned to pass only frequencies to one side of said predetermined frequency, mixing means receiving the output of said band-pass filter and receiving also a predetermined portion of signal at said predetermined frequency, a low pass filter receiving the output of said mixing means and tuned to pass only the difference frequency of the signals applied to said mixing means, and means for measuring the frequency of the output of said low pass filter to measure the speed of each vehicle in said detection zone traveling in said predetermined direction.

11. In a system for selectively measuring the speeds of vehicles moving in a predetermined one of two generally opposite directions through a detection zone defined by a beam of sound energy directed with a substantial component generally parallel to the direction of travel of said vehicles the combination comprising, means for transmitting said sound energy with a predetermined frequency, receiving means for receiving said sound energy following its reflection from said vehicle with its frequency shifted to one side or the other of said predetermined frequency according to the direction of travel of said vehicle and by an amount proportional to the component of vehicle velocity parallel to the direction of said sound beam, said receiving means including means for converting said sonic energy to an electrical signal having frequency components corresponding to those in the reflected sonic energy, a band-pass filter having said signal applied thereto and tuned to pass said predetermined frequency and frequencies to one side of said predetermined frequency only while suppressing frequencies lying to the other side of said predetermined frequency, mixing circuit means for heterodyning the output signals of said band-pass filter, a low pass filter receiving the output of said mixing means and tuned to pass only the difference frequency of the several frequency components appearing in the output of said mixing means, and means for measuring the difference frequency in the output of said low-pass filter means for measuring the speeds of vehicles traveling through said detection zone in said predetermined direction.

References Cited by the Examiner
UNITED STATES PATENTS

| | | | |
|---|---|---|---|
| 2,620,470 | 12/1952 | Rather | 340—39 |
| 2,752,593 | 6/1956 | Downs | 324—68.1 |
| 2,785,395 | 3/1957 | Platzman | 343—8 |
| 2,878,467 | 3/1959 | Barker | 343—8 |
| 3,072,901 | 1/1963 | Hans-Klaus Ruppersberg | 343—1 |
| 3,098,213 | 7/1963 | Aver | 340—38 |
| 3,102,252 | 8/1963 | Bolton | 340—38 |
| 3,118,139 | 1/1964 | Durslewitz | 343—8 |

CHESTER L. JUSTUS, *Primary Examiner.*

SAMUEL BERNSTEIN, WALTER L. CARLSON,
*Examiners.*